(12) United States Patent  (10) Patent No.: US 8,661,368 B2
Maehiro et al.  (45) Date of Patent: Feb. 25, 2014

(54) SCROLL CONTROL ACCORDING TO INPUT OF CURSOR MOVEMENT

(75) Inventors: Kazutoyo Maehiro, Tokyo (JP); Tadashi Tsushima, Tokyo (JP); Koji Aoyama, Kanagawa (JP); Mitsuo Yoshioka, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1503 days.

(21) Appl. No.: 11/420,334

(22) Filed: May 25, 2006

(65) Prior Publication Data

US 2006/0277489 A1   Dec. 7, 2006

(30) Foreign Application Priority Data

May 25, 2005  (JP) ................................. P2005-153126

(51) Int. Cl.
*G06F 3/048*  (2013.01)
(52) U.S. Cl.
USPC .......................................... 715/856; 715/786
(58) Field of Classification Search
USPC ......... 715/794–796, 802, 828–831, 856–858, 715/786
See application file for complete search history.

(56) References Cited

U.S. PATENT DOCUMENTS

| | | | |
|---|---|---|---|
| 4,734,689 A | | 3/1988 | Kurakake |
| 5,298,890 A | * | 3/1994 | Kanamaru et al. ............. 345/157 |
| 5,333,247 A | * | 7/1994 | Gest et al. ..................... 345/672 |
| 5,510,808 A | * | 4/1996 | Cina et al. ..................... 345/684 |
| 5,519,827 A | * | 5/1996 | Mizushima .................... 715/807 |
| 5,655,094 A | * | 8/1997 | Cline et al. .................... 715/786 |
| 5,864,330 A | * | 1/1999 | Haynes .......................... 715/856 |
| 5,874,936 A | * | 2/1999 | Berstis et al. ................. 715/785 |
| 5,877,748 A | * | 3/1999 | Redlich ......................... 345/163 |
| 5,952,995 A | * | 9/1999 | Barnes .......................... 345/157 |
| 5,986,639 A | * | 11/1999 | Ozawa et al. ................. 715/856 |
| 5,990,862 A | * | 11/1999 | Lewis ........................... 715/858 |
| 6,020,887 A | * | 2/2000 | Loring et al. ................. 715/786 |

(Continued)

FOREIGN PATENT DOCUMENTS

| | | |
|---|---|---|
| EP | 0348031 | 12/1989 |
| JP | 61-250681 | 11/1986 |

(Continued)

OTHER PUBLICATIONS

A partial English language translation of Japanese Laid-Open Patent Publication No. SHO 61-250681.

(Continued)

*Primary Examiner* — Omar Abdul-Ali
*Assistant Examiner* — Andrew Tank
(74) *Attorney, Agent, or Firm* — Greenblum & Bernstein, P.L.C.

(57) ABSTRACT

In a main area of a display device, buttons and a map display area where a map is scrolled are provided. A cursor can be moved to an arbitrary position of the main area according to directional input received from an input device. When a decision input is performed with the input device when the cursor points to each button, processing assigned to the button to which the cursor points is performed. When a user inputs a direction and a special input button is not selected, the cursor is moved throughout the main area. When the user inputs a direction while the special input button is selected, the cursor is moved only within the map display area and the map is scrolled as required.

8 Claims, 11 Drawing Sheets

(56) References Cited

U.S. PATENT DOCUMENTS

| | | | |
|---|---|---|---|
| 6,201,540 B1* | 3/2001 | Gallup et al. | 715/764 |
| 6,211,879 B1* | 4/2001 | Soohoo | 715/854 |
| 6,259,432 B1* | 7/2001 | Yamada et al. | 345/159 |
| 6,683,626 B1* | 1/2004 | Abellera | 715/785 |
| 6,867,790 B1* | 3/2005 | Brooks | 715/856 |
| 2003/0020766 A1 | 1/2003 | Maehiro | |
| 2003/0034964 A1 | 2/2003 | Yoshioka | |
| 2003/0231164 A1 | 12/2003 | Blumer, Jr. et al. | |
| 2003/0233652 A1 | 12/2003 | Hsieh | |
| 2005/0192096 A1 | 9/2005 | Maehiro | |

FOREIGN PATENT DOCUMENTS

| | | |
|---|---|---|
| JP | 3-61997 | 3/1991 |
| JP | 3-292524 | 12/1991 |
| JP | 4-19793 | 1/1992 |
| JP | 5-27941 | 2/1993 |
| JP | 5-324623 | 12/1993 |
| JP | 10-31477 | 2/1998 |
| JP | 2003-114750 | 4/2003 |
| JP | 2004-271439 | 9/2004 |

OTHER PUBLICATIONS

A partial English language translation of Japanese Laid-Open Patent Publication No. HEI 4-19793.
A partial English language translation of Japanese Laid-Open Patent Publication No. HEI 10-31477.
A partial English language translation of Japanese Laid-Open Patent Publication No. 2004-271439.
A partial English language translation of Japanese Laid-Open Patent Publication No. HEI 3-61997.
A partial English language translation of Japanese Laid-Open Patent Publication No. 2003-114750.
Extended European Search Report in European Patent Application No. 06010857.8, dated Jan. 7, 2013.
A partial English language translation of Japanese Laid-Open Patent Publication No. SHO 61-250681, Published Nov. 7, 1986.
A partial English language translation of Japanese Laid-Open Patent Publication No. HEI 4-19793, Published Jan. 23, 1992.
A partial English language translation of Japanese Laid-Open Patent Publication No. HEI 10-31477, Published Mar. 2, 1998.
A partial English language translation of Japanese Laid-Open Patent Publication No. 2004-271439, Published Sep. 30, 2004.
A partial English language translation of Japanese Laid-Open Patent Publication No. HEI 3-61997, Published Mar. 18, 1997.
A partial English language translation of Japanese Laid-Open Patent Publication No. 2003-114750, Published Apr. 18, 2003.
English language Abstract of JP 4-19793, Published Jan. 23, 1992.
English language Abstract of JP 10-31477, Published Feb. 3, 1998.
English language Abstract of JP 2004-271439, Published Sep. 30, 2004.
English language Abstract of JP 3-61997, Published Mar. 18, 1991.
English language Abstract of JP 2003-114750, Published Apr. 18, 2003.
U.S. Appl. No. 11/392,773 to Aoyama et al., filed Mar. 20, 2006.
U.S. Appl. No. 11/420,119 to Minagawa et al., filed May 24, 2006.
U.S. Appl. No. 11/420,155 to Maehiro et al., filed May 24, 2006.
English language Abstract of JP 5-27941, Published Feb. 5, 1993.
English language Abstract of JP 5-324623, Published Dec. 1993.
English language Abstract of JP 3-292524, Published Dec. 24, 1991.

* cited by examiner

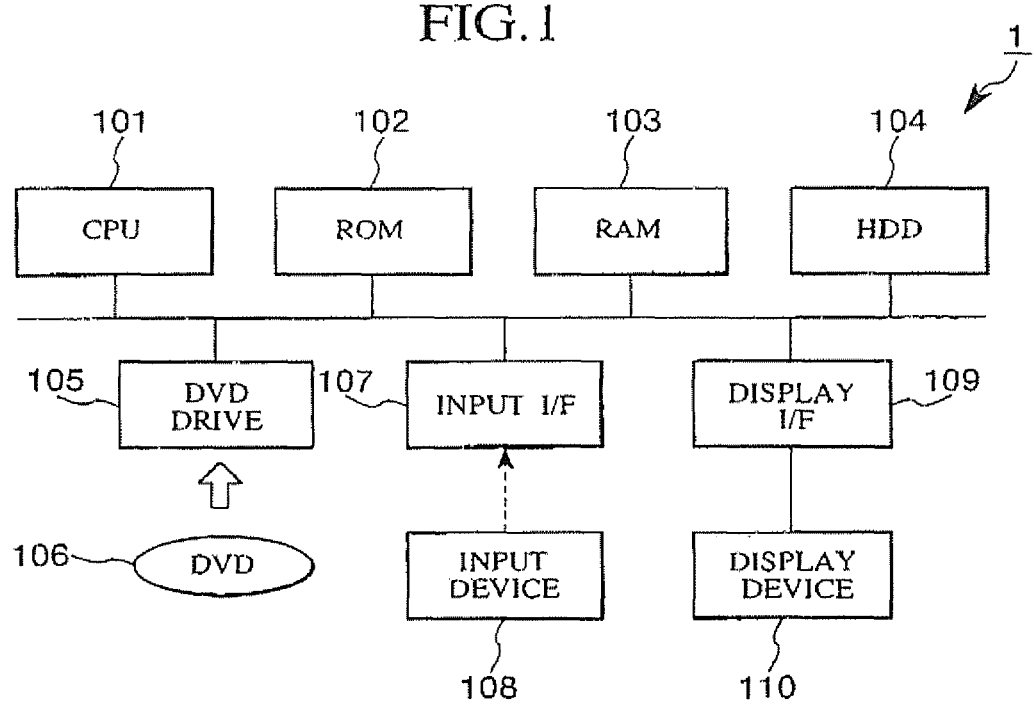
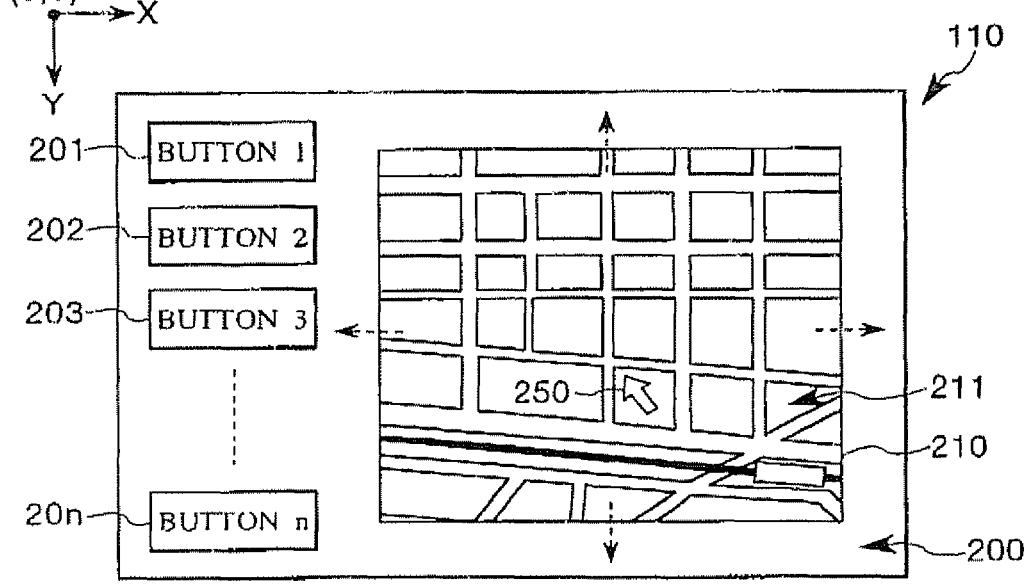

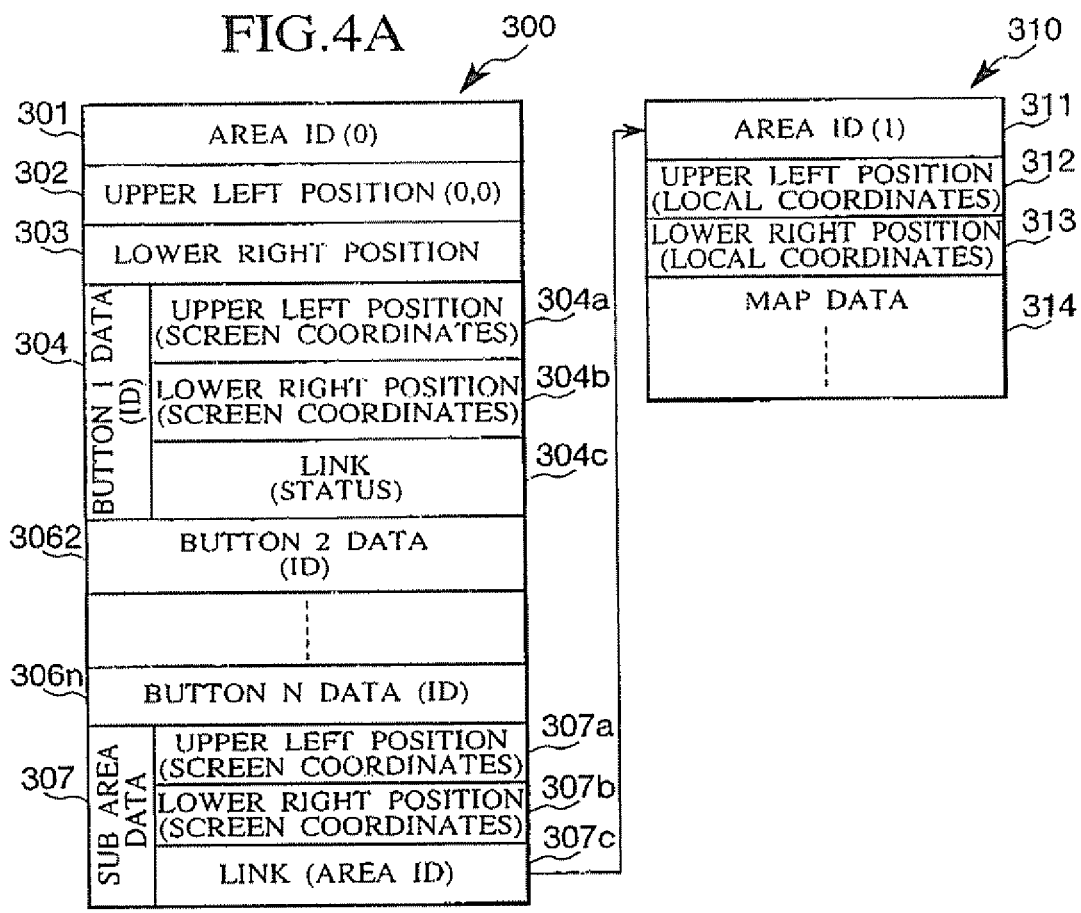
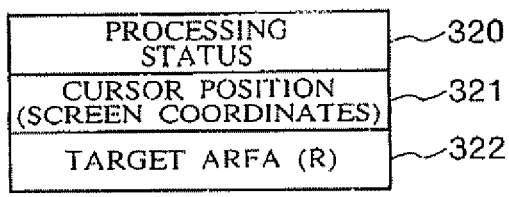
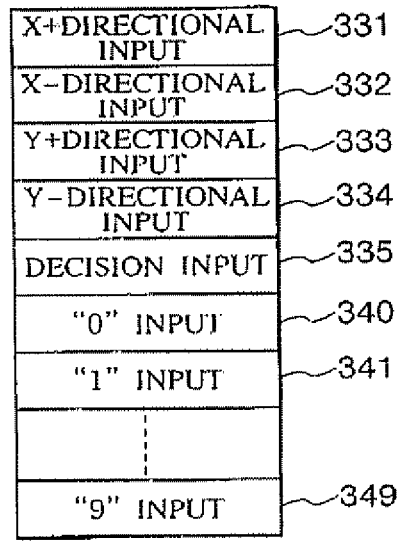

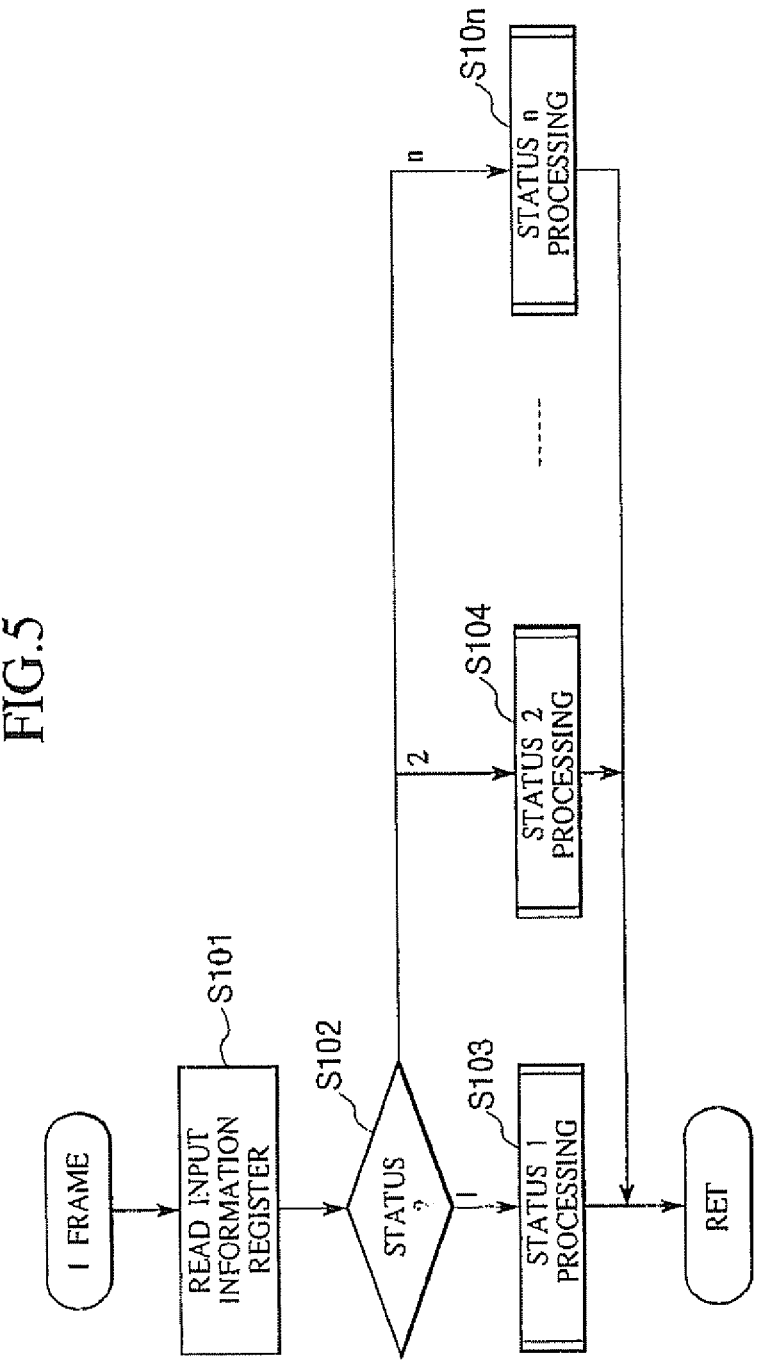

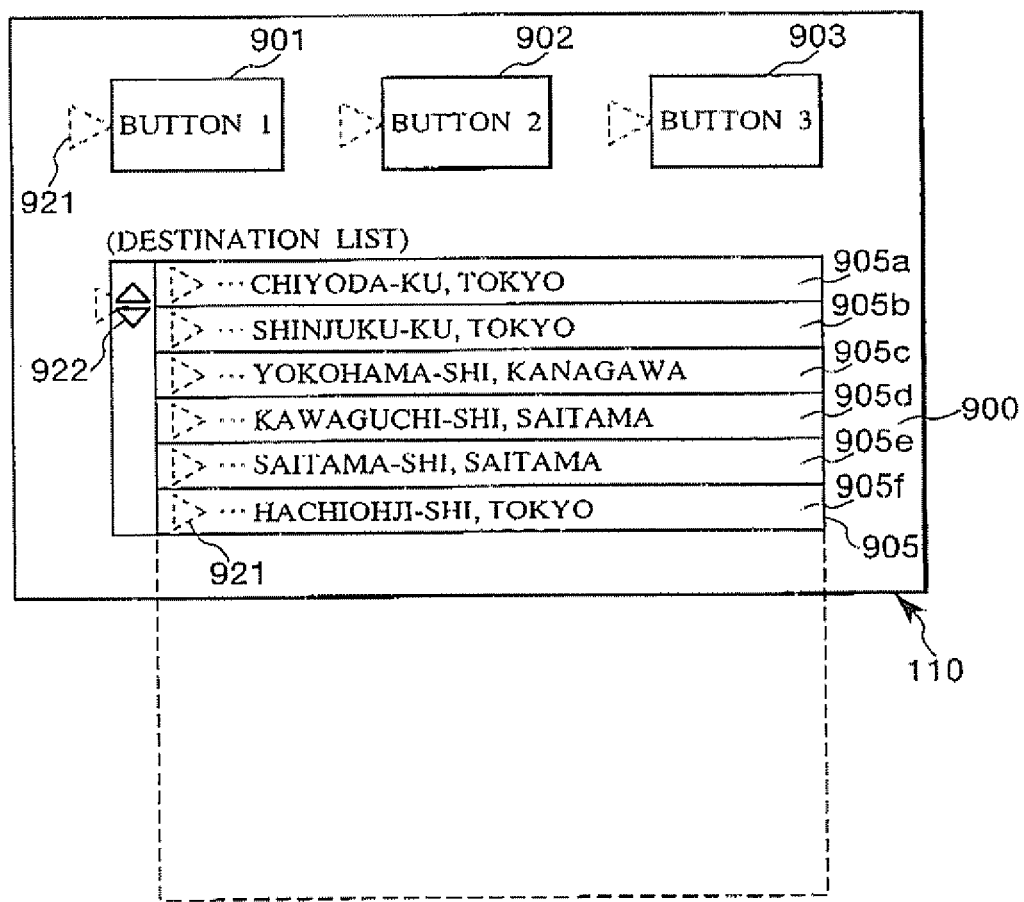

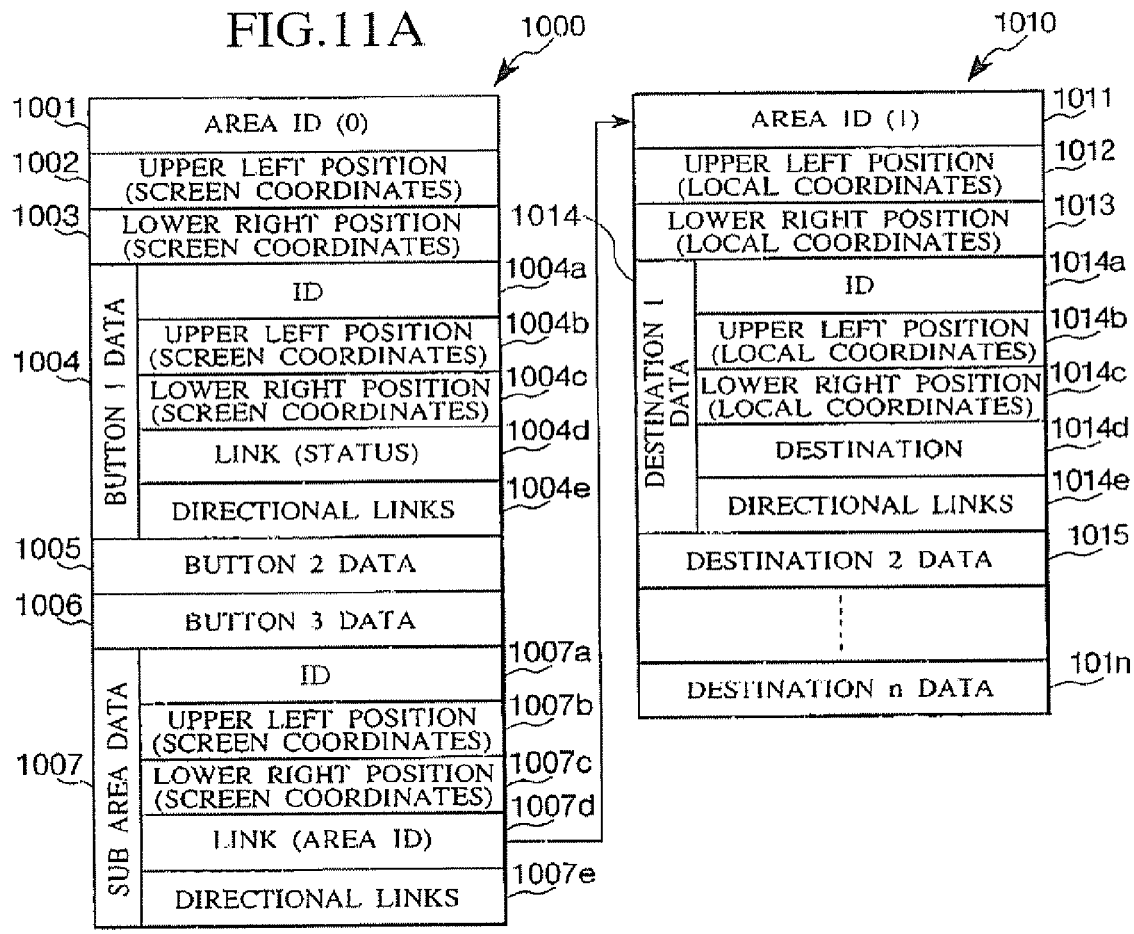

SCROLL CONTROL ACCORDING TO INPUT OF CURSOR MOVEMENT

CROSS REFERENCE TO RELATED APPLICATION

The present disclosure relates to subject matter contained in Japanese Patent Application No. 2005-153126, flied on May 25, 2005, (be disclosure of which is expressly incorporated herein by reference in its entirety.

BACKGROUND OF THE INVENTION

1. Field of the Invention

The present invention relates to screen display. More specifically, the present invention relates to scrolling information displayed in a scroll area set within a display area according to an input of a cursor movement.

2. Description of the Related Art

Conventionally, in an information processing apparatus, when the size of information displayed in a display area on a display device in larger than that of the display area, the entirety of the information is displayed by scrolling. Generally, when selecting a desired object from multiple candidates displayed on the display device is that a predetermined input is received from an input device when a cursor is positioned at the desired object. The cursor is moved according to the operation of the input device performed by the user.

In Unexamined Japanese Patent Publications No. S61-250681, No. H4-19793, No. H10-31477, and 2004-271439 (hereinafter referred to as publication group A), there is provided a scroll instruction area around a scroll area where information is scrolled. The user operates the input device and inputs a predetermined instruction when the cursor is positioned in the scroll instruction area. By inputting the predetermined instruction, information is scrolled in the scroll area.

In Unexamined Japanese Patent Publications No. H3-61997 and No. 2003-114750 (hereinafter referred to as publication group B), when an instruction for moving a cursor to the outside of a scroll area is input from an input device and the cursor is positioned at an end of a scroll area, information is scrolled in the scroll area without moving the position of the cursor.

There may be a display area which includes a scroll area and objects other than those in the scroll area. In is case, the user needs to freely move the cursor in the main area to select a desired object other than those in the sell area. The user needs to scroll information while moving the cursor in only the scroll area to select an object displayed in the scroll area.

However, in the publication group B, the user can scroll information while moving the cursor in the scroll area by one operation. However, the cursor must be moved in the scroll area. The publication group B does not disclose that the cursor is designed to move outside of the scroll area with an easy operation.

In the publication group A, the user can move the cursor in the main area and scrolls information in the scroll area by a simple operation. However, the publication group A do not disclose that the cursor can be moved in only the scroll area. In the publication group A, since the scroll instruction area, which is not the area for displaying information that the user originally wishes to view, is provided around the scroll area, the size of the scroll area must be reduced.

In any of the above-mentioned publications, it can be considered that both cursor movement and information scroll are performed on the assumption that the number of areas where information can be scrolled is only one main area. On the other hand, it is possible to create a screen which has a second scroll area where second information is scrolled inside of the roll area where first information is scrolled. However, in all of the above-mentioned publications, it is impossible to scroll information in any of the scroll areas with an easy operation while moving the cursor in one of the scroll areas on a screen having multiple scroll areas.

SUMMARY OF THE INVENTION

It is an object of the present invention to provide a scroll control device and the like, capable of scrolling information in a scroll area provided in a main area while moving a cursor in the main area with an easy operation.

A scroll control method according to a first aspect of the present invention controls scrolling of second information in a scroll area, which is preset within a display area of first information, according to an input from an input device.

The scroll control method moves a cursor throughout the display area or within the scroll area according to an input movement instruction and an input scroll instruction. The scroll control method further determines whether the scroll instruction for scrolling the second information in the scroll area is input when the cursor is positioned in the scroll area. The scroll control method further scroll the second information in the scroll area according to the input movement instruction, when it is determined the scroll instruction is input and the cursor is positioned in the scroll area.

The cursor is moved within the display area according to the input movement instruction, when it is determined that the scroll instruction is not input. The cursor is moved only within the scroll area according to the input movement instruction, when it is determined that the scroll instruction is input and the cursor is positioned in the scroll area.

In the scroll control method, when the scroll instruction is not input, the cursor is moved within the scroll area according to the movement instruction input from the input device. When the scroll instruction is input, the cursor is moved within the scroll area according to the movement instruction input while scrolling the second information in the scroll area as required.

When a user inputs the movement instruction, the cursor moves. The difference between moving the cursor throughout the display area and moving the cursor within the scroll area is only whether the scroll instruction is input. When the user inputs the movement instruction and the scroll instruction, the information in the scroll area is scrolled as required. Since there is only a slight difference between the operation for moving the cursor in the display area and that for moving the cursor in the scroll area while scrolling the information, the user does not have to significantly change the operation method, making it possible to improve user operability. A simple device also be used as the input device.

A scroll control apparatus according to a second aspect of the present invention controls scrolling of second information in a scroll area, which is preset within a display area of first information, according to an input from an input device.

The scroll control apparatus includes a scroll instruction determining section that determines whether a scroll instruction is input when a cursor is positioned within the scroll area. The scroll control apparatus further includes a cursor mover that moves the cursor within the display area, including outside of the scroll area, according to an input movement instruction, when it is determined that the scroll instruction is input. The scroll control apparatus further includes a scroll controller that scrolls the second information in the scroll area according to the input movement instruction when it is determined that the scroll instruction is input. The scroll control apparatus further includes a limited cursor mover that limits movement of the cursor to be within the scroll area according to the input movement instruction when it is determined that the scroll instruction is input.

A scroll control apparatus according to a third aspect of the present invention is connected to a display device for displaying a display area where first information is displayed and a scroll area is preset. The scroll control apparatus is also connected to an input device for inputting an instruction from a user. The scroll control apparatus moves a cursor in the display area according to the input instruction and scrolls second information in a scroll area. The scroll control apparatus includes a program memory that stores a program and a processor that executes the program.

The program includes a determining code segment that determines whether a scroll instruction is input when a cursor is positioned within the scroll area. The program further includes a cursor moving code segment that moves the cursor within the display area, including outside of the scroll area, according to an input movement instruction, when it is determined that the scroll instruction is input. The program further includes a scrolling code segment that scrolls the second information in the scroll area according to the input movement instruction when it is determined that the scroll instruction is input. The program further includes a limited cursor moving code segment that limits movement of the cursor to be within the scroll area according to the input movement instruction when it is determined that the scroll instruction is input.

In the scroll control apparatus according to the third aspect of the present invention, the program stored in the program memory can be provided by recording the program on a computer-readable storage medium. This computer-readable storage medium may be a storage medium, which is structured to be attachable and detachable to and from the scroll control apparatus to be provided separately from the scroll control apparatus. This computer-readable storage medium may be a storage medium such as a fixed disk apparatus, which is provided in the scroll control apparatus provided together with the scroll control apparatus. The program stored in the program memory in the scroll control apparatus according to the third aspect of the present invention can be distributed via a network from the server apparatus exist on the network after superimposing the data signal of the program on a carrier wave.

BREIF DESCRIPTION OF THE DRAWINGS

FIG. 1 is a block diagram illustrating a configuration of a car navigation system according to embodiments of the present invention;

FIG. 2 is a view illustrating a main screen displayed on a display device according to a first embodiment of the present invention;

FIG. 4A is a view illustrating data components of the main screen according to the first embodiment of the present invention;

FIG. 4B is a view illustrating various types of registers for controlling the display of the main screen according to the first embodiment of the present invention;

FIG. 4C is a view illustrating a configuration of an input information register according to the first embodiment of the present invention;

FIG. 5 is a flowchart illustrating the main processing executed for each frame period according to the first embodiment of the present invention;

FIG. 9 is a view illustrating a destination selection screen displayed on the display device according to a second embodiment of the present invention;

FIG. 11A is a view illustrating data components of the destination selection screen according to the second embodiment of the present invention;

FIG. 11B is a view illustrating various types of registers for controlling the display of the destination selection screen according to the second embodiment of the present invention;

FIG. 11C is a view illustrating a configuration of an input information register according to the second embodiment of the present invention.

DETAILED DESCRIPTION OF THE PREFERRED EMBODIMENTS

Figure 3A:
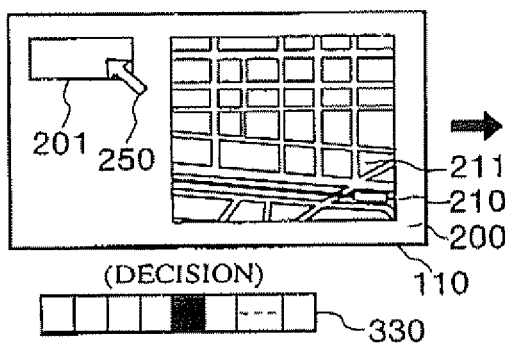
FIGS. 3A to 3F are views each illustrating a state in which a display mode of the main screen is changed in response to an input from an input device according to the first embodiment of the present invention.

The following will explain a first embodiment of the present invention with reference to FIGS. 1 to 8.

FIG. 1 is a block diagram illustrating a configuration of a car navigation system 1 applied to this embodiment. As illustrated in this figure, the car navigation system 1 includes a CPU (Central Pressing Unit) 101, a ROM (Read Only Memory) 102, a RAM (Random Access Memory) 103, a HDD (Hard Disk Drive) 104, a DVD drive 105, an input interface 107, and a display interface 109. A DVD (Digital Video Disc) 106, serving as a storage medium, can be attached to the DVD drive 105. An input device 108 is connected to the input interface 107 via infrared wireless communication. A display device 110 is connected to the display interface 109.

The CPU 101 executes a program stored in the RAM 103 to control the components 102 to 110 of the car navigation system 1 and to perform various processing such as display of a main screen to be described later. The CPU 101 includes an internal timer that generates a timer interrupt to be described later. The ROM 102 stores a boot program for the CPU 101 and fixed data. The HDD 104 stores a program, which is transferred to the RAM 103 and executed by the CPU 101 and data of various kinds.

The RAM 103 stores the program, which is transferred from the HDD 104 and data necessary for processing by the CPU 101. An input information register to be described later is stored in a predetermined area of the RAM 103. The RAM 103 has two frame memories in which an image is developed. One of two frame memories is used for developing image data and the other is used for reading the image data. Each frame memory is alternately switched to be for developing or reading every frame.

The DVD drive 105 reads a program and data recorded on the DVD 106 and stores the read program and data in the RAM 103 or HDD 104 under control of the CPU 101. The input interface 107 is an interface device that receives input information from the input device 108 and stores the received input information in input information register of the RAM 103.

The input device 108 can include a joystick and ten special numeric keys of "0" to "9." For example, a "1" input could be performed by pressing a "1" key of the input device to activate a special function associated with the "1" key. The joystick is an input device that performs directional inputs of up, down, left, and right and a decision input. When the joystick is moved upward, an upward directional input (input for y− directional input to be described later) is performed. When the joystick is moved downward, a downward directional input (input for y+ directional input to be described later) is performed. When the joystick is moved left, a left directional input (input for x− directional input to be described later) is performed. When the joystick is moved right, a right directional input (input for x+ directional input to be described later) is performed.

For example, when the joystick is moved upper right, both right and upward directional inputs are simultaneously performed. When the joystick is depressed in a vertical direction, the decision input is performed.

The display interface 109 is an interface device that sends imago data such as a main screen (to be described later) generated by processing of CPU 101 to the display device 110 and causes the display device 110 to display the corresponding image. The display device 110 displays various kinds of images, e.g., an image of a main screen (to be described later), necessary for processing the car navigation system 1 according to the image data sent from the display interface 109.

FIG. 2 is a view illustrating a main screen 200 displayed on the display device 110 according to this embodiment. The display position of the image on the display device 110 is specified by coordinates set on a pixel basis of the display device 110. In the display area of the display device 110, an upper left position is an origin (0, 0). The right direction is an x+ direction and the left direction is an x− direction. The lower direction is a y+ direction, and the upper ion is a y− direction. The display position of the image on the display device 110 is specified in the same manner in any eases other than when displaying the main screen 200.

On the main screen 200, multiple buttons 201 to 20n are arranged on the left side and a map display area 210 for displaying a map 211 is provided on the right side. A map 21 displayed in the map display area 210 is larger in size than the map display area 210, and only a part of the map 210 is displayed at one time. All of the data of the map 211 is stored in the HDD 104. The map 211 is scrolled in the map display area 210. The main screen 200 has a cursor 250 that is moved according to the directional inputs of up, down, left and right from the input device 108.

When the decision input is performed from the input device 108 and the cursor 250 is positioned in one of buttons 201 to 20n, a processing status to be described later is changed and processing, which is associated with the button at which the cursor 250 is positioned, is carried out. When the decision input is performed and the cursor 250 is positioned in the map display area 210, information of a position (address) on the map 211 at which the cursor 250 is positioned is obtained by the CPU 101 and the result is temporarily stored in the RAM 103.

In accordance with an aspect of the present invention, when a "1" input is not received from the input device 108, the cursor 250 moves within the main screen 200. In the case where the "1" input is received from the input device 108, the cursor 250 moves within only the map display area 210 according to the directional input from the input device 108. In this case, when the cursor 250 is to move out of the range of the map display area 210 according to the directional input from the input device 108, the map 211 is scrolled in the map display area 210 without moving the position of the cursor 250. That is, the "1" button activates a scrolling function.

Figure 3B:
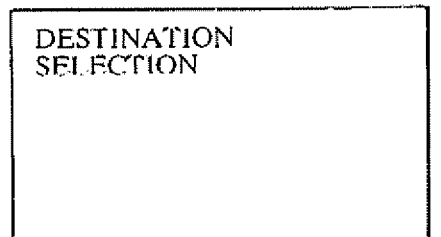
Figure 3C:
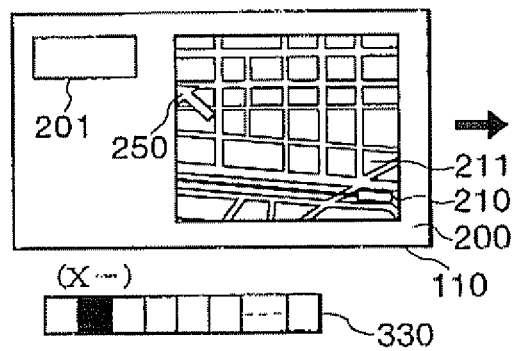
Figure 3D:
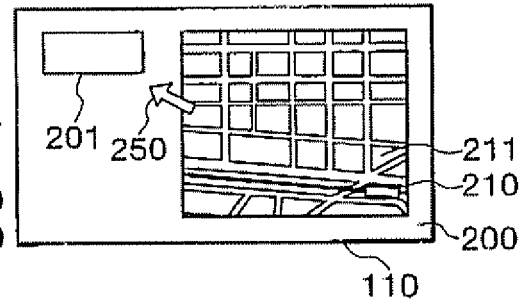
Figure 3E:
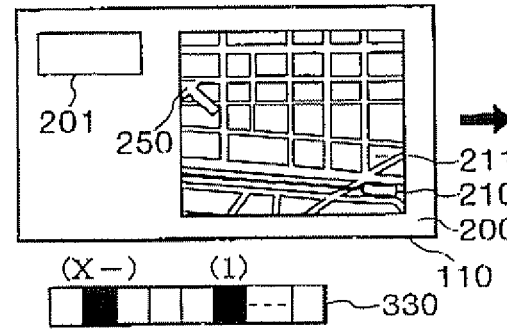
Figure 3F:
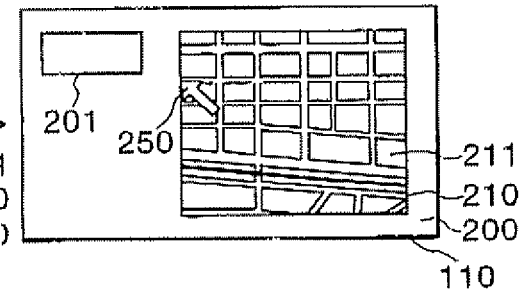

The following will explain the relationship between the input from the input device 108 and the change in the display of the main screen 200 based on specific examples. FIGS. 3A to 3F are views each illustrating examples in which the display mode of the screen 200 is changed according to the input from the input device 108. FIGS. 3A and 3B illustrate a first example. FIGS. 3C and 3D illustrate a second example. FIGS. 3E and 3F illustrate a third example.

In the first example, it is assumed that the cursor 250 is positioned within the range of the button 201 as illustrated in FIG. 3A. In this state, it is assumed that not the "1" input but the decision input is performed by the input device 108. In this case, when it is assumed that processing associated with the button 201 is the display of a destination selection screen, the destination selection screen is displayed on the display device 110 as illustrated in FIG. 3B.

In the second example, it is assumed that the cursor 250 is positioned at the left edge of the map display area 210 as illustrated in FIG. 3C. In this state, it is assumed that not the "1" input but the left directional input (x• directional input) is received form the input device 108. In this case, since the target area (discussed later) is the main area of the display device 110, the cursor 250 is moved outside of the map display area 210 as illustrated in FIG. 3D.

In the third example, it is assumed that the cursor 250 is positioned at the left edge of the map display area 210 as illustrated in FIG. 3E, similar to the second example. In this state, it is assumed that the "1" input and the left directional input (x− directional input) are received from the input device 108. In this case, since the target area (discussed later) is the map display area 210, the map 211 is scrolled in the map display area 210 without moving the cursor 250 out of the range of the map display area 210 as illustrated in FIG. 3F.

An explanation will be given of various data necessary for displaying the main screen 200 on the display device 110. FIG. 4A is a view illustrating data components of the main screen 200 in FIG. 2. As illustrated in the figure, data of the main screen 200 is composed of main area data 300 and map display area data 310. The map display area data 310 is data for displaying the map 211 in the map display area 210. The main area data 300 is data for displaying data, other than the map 211 in the map display area data 310, in the main area of the display device 110.

The main area data 300 and the map display area data 310 have area IDs 301 and 311, respectively. Number "0" is assigned to the area ID 301 of the main area data 300. Number "1" is assigned to the area ID 311 of the map splay area data 310. The area IDs 301 and 311 are used to determine whether the main area of the display device 110 is a processing target for movement of the cursor 250 and whether only the map display area 210 is a processing target for movement of the cursor 250, respectively.

The main area data 300 has an upper left position 302 and a lower right position 303. The upper left position 302 is coordinates of the upper left position of the main area on the display device 110. The upper left position is at the coordinates (0, 0). The lower right position 303 is coordinates of the lower right position of the main area on the display device 110. For example when the display device 110 is configured in 640×480 dots, the upper right position 303 is at the coordinates (639, 479).

The main area data 300 includes button 1 data 304 and button 2 data to button-n data 3062 to 306n, which respectively correspond to the buttons 201 to 20n arranged in the main screen 200, and sub area data 307 corresponding to the map display area 210. The button-1 data 304 includes an upper left position 304a, which is indicated by the coordinates of the upper left position of the button 201, and a lower right position 304b indicated by the coordinates of the lower right position of the button 201. Sub area data 307 also includes an upper left position 307a, which is indicated by the coordinates of the upper left position of the map display area 210, and a lower right position 307b indicated by the coordinates of the lower right position of the map display area 210.

The button-1 data 304 has link data 34c. The button-1 data 304c indicates a processing status which will be updated when a decision input is performed from the input device 108 and the cursor 250 is positioned in the button-1 201. The sub area data 307 has link data 307c. Link data 307c indicates an area ID (area ID 311 of the map display area data 310 in this example) of the map display area 210. Although not illustrated, the detailed configuration of the button-2 data to the button-n data 3062 to 306n is the same as that of the button 1 data 304.

The map display area data 310 has an upper left position 312 and a lower right position 313. The upper left position 312 is local coordinates, which are set on the map 211, of a point, displayed at the upper left position of the map display area 210. The lower right position 313 is local coordinates of a point, which is displayed at the lower right position of the map display area 210. The map display area data 310 includes map data 314 of the map 211 displayed in the map display area 210.

In FIG. 4A, each of the main area data 300 and the map display area data 310 is described as one group of data. When data 301 to 307 and 311 to 314 included in the main area data 300 and the map area data 310 are associated with one another by link information, individual data 801 to 307 and 311 to 314 may be stored in either of the RAM 103 and HDD 104. For example, among the map display area data 810, the upper left position 312 and the lower right position 813 may be stored in the RAM 103; however, the area ID 311 and the map data 314 may be stored in the HDD 104.

FIG. 4B is a view illustrating various types of registers prided in the RAM 103 to control the display of the main screen 200. The registers to control the display of the main screen 200 include a processing status register 320, a cursor position register 321, and a target area register 322.

The processing status register 320 is a register that stores a processing status for determining which processing should be executed for each frame period. When the processing status stored in the processing status register 320 is "1", the main screen 200 is displayed on the display device 110. The cursor position register 321 is a register that stores coordinates of the display position of the cursor 250 on the display device 110. The target area register 322 is a register that stores an area ID of "0" or "110" depending on whether the area as a processing target for movement of the cursor 250 is the main area of the display device 110 or the map display area 210.

FIG. 4C is a view illustrating a configuration of an input information register provided in the RAM 103. An input information register 330 is prepared one bit by one bit for each kind of input from the input device 108. The input information register 330 includes an x+ directional input bit 331, an x− directional input bit 332, a y+ directional input bit 333, a y− directional input bit 334, a decision input bit 335, and a "0" input bit 340 to "9" input bit 349. Each of the bits 331 to 349 is set when each corresponding input is received from the input device 108. For example, when the "0" numeral key is input, the "0" input bit 340 is set.

When the contents of the input information register 330 are read by the CPU 101, all bits 331 to 349 of the input information register 330 are reset. Bits 331 to 334 and 340 to 349, except the decision input bit 335, are set again immediately after they are reset and the corresponding inputs are continuously performed from the input device 108. The decision input bit 335 is set only at the timing when the decision input is first performed from the input device 108 (namely, timing when the joystick is depressed in the vertical direction). When reset, the decision input bit 335 is not set again even when the decision input is continuously performed (even when the joystick is kept depressed in the vertical direction).

The following will explain process in the car navigation system 1 according to this embodiment. In this or navigation system 1, an image is displayed on the display device 110 according to the processing status stored in the processing status register 320. The image displayed on the display device 110 can be switched every frame (for example, 1/30 sec.). The main processing is carried out every frame period to display a different image on the display device 110 for each frame period.

FIG. 5 is a flowchart illustrating a main process executed each frame period by the CPU 101 in the car navigation system 1 according to this embodiment. The processing in this flowchart is executed whenever a timer interruption is generated every 1/30 sec. by the internal timer of the CPU 101. The processing in this flowchart ends every 1/30 sec. without regard to the processing status stored in the process status register 320.

When processing is started for a new frame period, the CPU 101 reads the contents of the input information register 330 and stores the result in a predetermined area of the RAM 103. By reading the contents, the contents of the input information register 330 are cleared (step 8101). The CPU 101 determines the current processing status by referring to the processing status 320 (step S102).

The CPU 101 executes status 1 processing (step S103), status 2 processing (step S104), . . . status n processing (step S10n) according to the determined processing status. The details of the status 1 processing will be described later. The status 2 processing to status n processing are not related to tale present invention and the detailed explanation is omitted. When the status 1 processing . . . status n processing end, the main processing for the relevant frame period is ended. The CPU 101 is in a standby state until the main processing is started for the next frame period.

Processing for writing information into the input information register 330 according to the input from the input device 108 is always carried out by a routine different from this flowchart. For example, when the x− directional input was received from the input device 108 for a previous frame period, the x− directional input bit 332 is set in the input information register 330 read for a current frame period.

When the x− directional input is continued from the previous frame period to the current frame period, the x− directional input bit 332 included in the input information register 330 read for the current fame period is set. The x− directional input bit 332, which is to be read for a next frame period, is a set. The same holds true for the other directional inputs, and the numeric inputs. When the decision input is continued from the previous frame period to the current frame period, the decision input bit 335 included in the input information register 330 read for the current frame period is set. However, the decision input bit 335, which is to be read for a next frame period, is not set.

Figure 6:
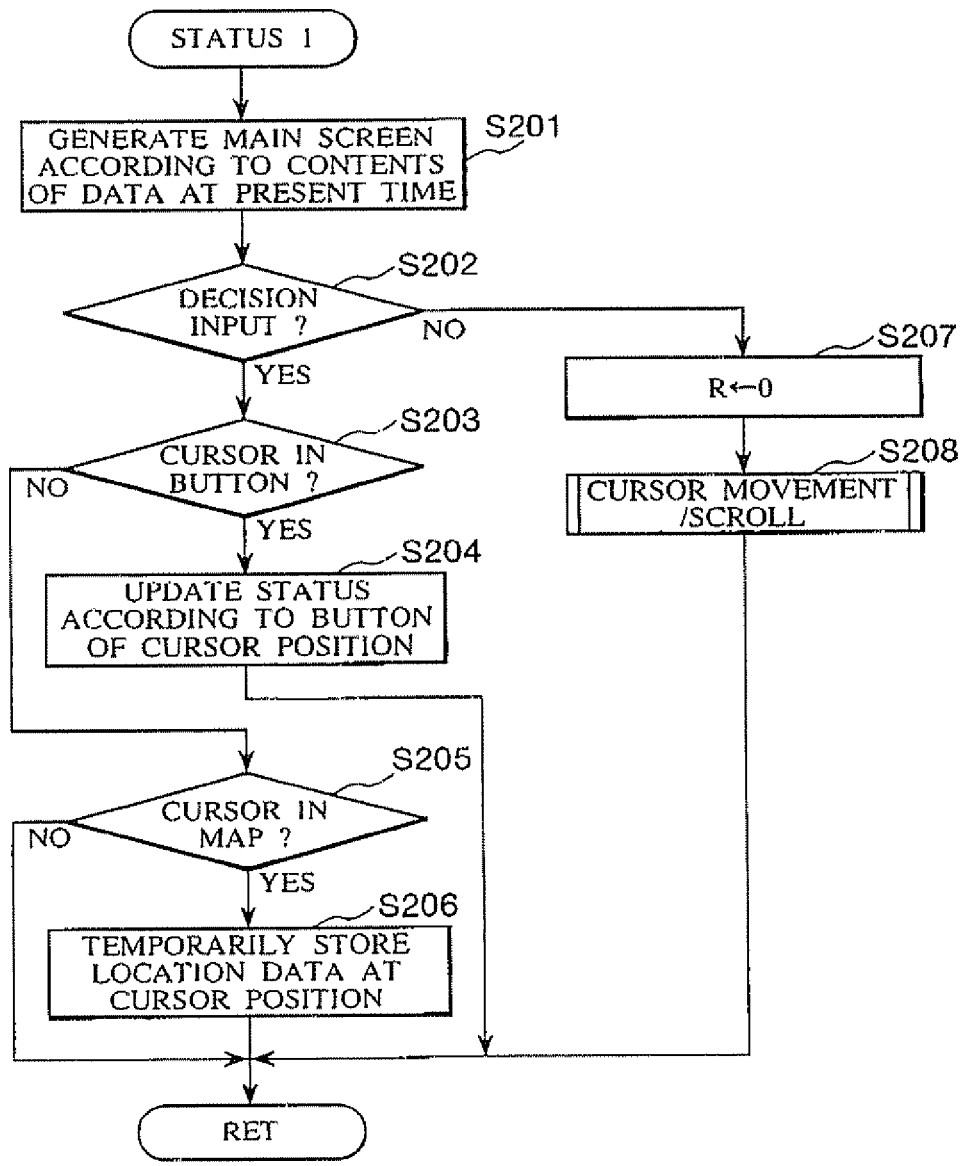
FIG. 6 is a flowchart specially illustrating status 1 processing of FIG. 5.

The status process in step S103 will be explained. FIG. 6 is a flowchart illustrating exemplary status 1 processing.

In the status 1 processing, the CPU 101 outputs image data, which was developed in the frame memory of the RAM 103 for the previous frame period, to the display device 110 via the display interface 109 and causes the display device 110 to display the corresponding image. Except the case in which the processing status has just changed to "1" from the previous frame period, the image displayed on the display device 110 is an image of the main screen 200 to which the cursor 250 is added.

The CPU 101 generates image data of the main screen 200 based on the main area data 300 and the map display area data 310 at the present time and develops the generated image data in the frame memory (different from the data used for the previous period) of the RAM 103. The CPU 101 overlays image data of the cursor 250 on the image data of the main screen 200 developed in the frame memory (step S201).

The CPU 101 determines whether the decision input is received from the input device 108 or the previous frame period based on whether the decision input bit 335 of the input information register 330 read in step S101 is set (step S202). When the decision input is received, the CPU 101 determines whether the cursor 250 points to any of buttons 201 to 20n by referring to the cursor position register 321 and the button 1 data 304 to button-n data 306n(step S203).

When the cursor 250 is added to one of the buttons 201 to 20n, the CPU 101 updates the processing status of the processing status register 320 according to the link 304c of the button to which the cursor 250 points (step S204). The status 1 processing ends and the processing returns to the main processing of FIG. 5. The main processing also ends, so that the CPU 101 is in a standby state.

When the cursor 250 dose not point to any of buttons 201 to 20n, the CPU 101 determines whether the cursor 250 is within the range of the map display ma 210 by referring to the cursor position register 321 and the sub area data 307 (step S205). When the cursor 250 is not within the range of the map display area 210, the status 1 processing ends and the processing returns to the main processing of FIG. 5. The main processing also ends, so that the CPU 101 is in a standby state.

When the cursor 250 is within the range of the map display area 210, the CPU 101 obtains an address of the position on the map 211 corresponding to the position of the cursor 250 and temporarily stores the obtained address in a predetermined area of the RAM 103 (step S206). The status 1 processing ends and the processing returns to the main processing of FIG. 5. The main processing also ends, so that the CPU 101 is in a standby state.

When the decision input is not performed in step S201, the CPU 101 stores "0", serving as an initial value for a target area, in the target area register 322 (step S207). The CPU 101 executes cursor movement/scroll process (step S208). When the processing returns to the status 1 processing from the cursor movement/scroll processing, the status 1 processing ends and the processing returns to the main processing of FIG. 5. The main processing also ends, so that the CPU 101 is in a standby state.

Figure 7:
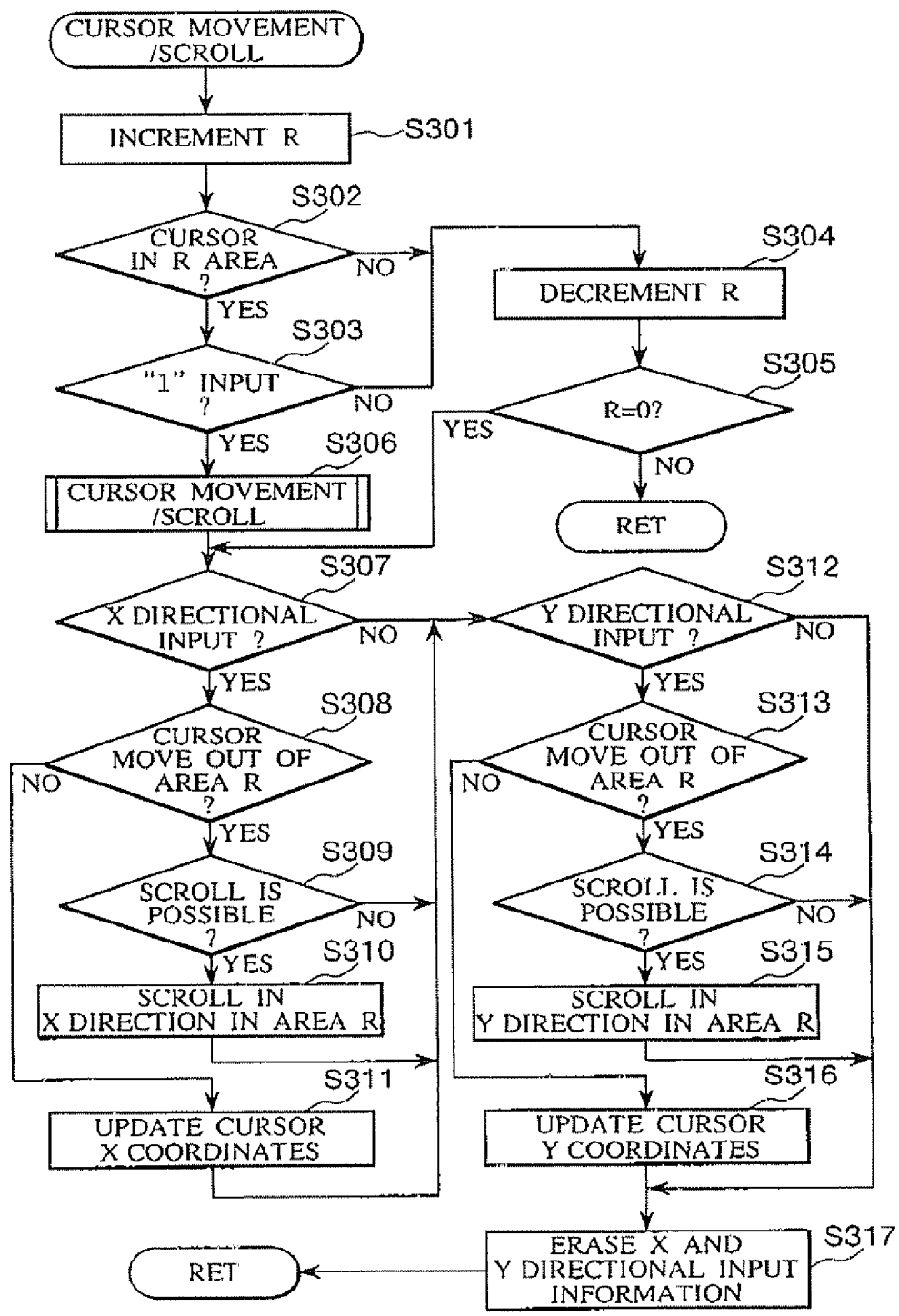
FIG. 7 is a flowchart spec illustrating cursor movement/scroll processing of FIG. 6.

The cursor movement/scroll process in step S208 will be explained. FIG. 7 is a flowchart illustrating exemplary cursor movement/scroll processing.

In the cursor movement/scroll processing, the CPU 101 increments the value stored in the target area register 322 by one (step S301). The CPU 101 reads the coordinates of the position of the cursor 250 stored in the cursor position register 321 and determines whether the cursor 250 is positioned in the area (the main area of the display device 110 is applied in the case where the value stored in the target register 322 is "0" and the map display area 210 is applied in the case where the value is "1") corresponding to the value of the target area stored in the target area register 322 (step S302). The CPU 101 determines whether the "1" input bit 341 of the input information register 330 read in step S101 is set (step 5303).

When the cursor 250 is not positioned in the area corresponding to the value stored in the target area register 322 or the "1" input bit 341 of the input information register 330 is not set, the CPU 101 decrements the value of the target area stored in the target area register 322 by one (step S304). The CPU 101 determines whether the value stored in the target area register 322 is "0" (step S305). When the value stored in the target area register 322 is "0", the processing goes to step S307. When the value stored in the target area register 322 is not "Y", the processing is returned to the processing of the calling source for the cursor movement/scroll processing.

The CPU 101 recursively calls the cursor movement/scroll processing when determining that the "1" input bit 341 of the input information register 330 is set (step S306). When the processing is returned to step S306 from the recursively called cursor movement/scroll processing, the processing goes to step S307.

In step S307, the CPU 101 determines whether the x+ directional input bit 331 or x− directional input bit 332 of the input information register 330 read in step S101 is set. When neither the x+ directional input bit 331 nor x− directional input bit 332 is set, the pressing goes to step S312.

When the x+ directional input bit 331 or x− directional input bit 332 is set, the CPU 101 determines whether the cursor 250 will move out of the range of the area corresponding to the value stored in the target area register 322 according to the position of the cursor 250 stored in the cursor position register 321 and the input direction (step S308).

When the cursor 250 will move out of the range of the area corresponding to the value stored in the target area, the CPU 101 determines whether information can be scrolled in the relevant area (step S309). When the value stored in the target area register 322 is "0", which corresponds to the main area of the display device 110, information cannot be scrolled. When the value stored in the target area register 322 is "1", which corresponds to the map splay area 210, information can be scrolled except when the end of the map 211 is displayed in the map display area 210.

When information can not be scrolled, the processing goes to step S312. When information can be scrolled, the CPU 101 updates the upper left position 312 and lower right position 313 of the map display area data 310 according to the input direction, and scrolls the map 211 in the map display area 210 (step S310). The scrolled result is, of course, displayed on the display device 110 for a next frame period. The processing goes to step S312.

In step S308 when the cursor 250 will not move out of the range of the area corresponding to the value stored in the target are register 322, the CPU 101 updates the x coordinate of the position of the cursor 250 stored in the cursor position register 321 according to the input direction (step S311). The processing goes to step S312.

In step S312, the CPU 101 determines whether the y+ directional input bit 333 or y− directional input bit 334 of the input information register 330 read in step S101 is set. When neither y+ directional input bit 333 nor y− directional input bit 334 is set, the processing goes to step S317. When the y+ directional input bit 333 or y− directional input bit 334 is set, the CPU 101 determines whether the cursor 250 will move out of the range of the area corresponding to the value stored in the target area register 322 according to the position of the cursor 250 stored in the cursor position register 321 and the input direction (step S313).

When the cursor 250 will move out of the range of the area corresponding to the value stored in the target area register 322, the CPU 101 determines whether information can be scrolled in the relevant area (step 8314). When the value stored in the target area is "0", information cannot be scrolled. When the value stored in the target area is "1", information can be scrolled except when the end of the map 211 is displayed in the map display area 210.

When information can not be scrolled, the processing goes to step S317. When information can be scrolled, the CPU 101 updates the upper left position 312 and lower right position 313 of the map display area data 310 according to the input direction and scrolls the map 211 in the map display area 210 (step S315). The scrolled result is, of course, displayed on the display device 110 for a next frame period. The processing goes to step S316.

In step S313, when the cursor 250 will not move out of the range of the area corresponding to the value stored in the target area register 322, the CPU 101 updates the y coordinate of the position of the cursor 250 stored in the cursor position register 321 according to the input direction (step S318). The processing goes to step S317.

In step S317, the CPU 101 erases data corresponding to the x+ directional input bit 331, x− directional input bit 332, y+ directional input bit 333, and y− directional input bit 334 that were read from the input information register 330 and stored in a predetermined area of the RAM 103 in step S101. The processing is returned to the calling source of cursor movement/scroll processing.

The following will explain a relationship between the calling of cursor movement/scroll processing and execution of the cursor movement/scroll processing. The cursor movement/scroll pre is first called in step S208. At the time when the cursor movement/scroll processing is called in step S208, the value stored in the target area register 322 is "0" regardless of the position of the cursor 250 and the presence or absence of the "1" input. When the cursor movement/scroll processing called in step S208 is started, the value stored in the target area register 322 is incremented to "1" in step S301.

When the position of the cursor 250 is not within the range of the map display area 210 or "1" input is not performed from the input device 108, the value stored in the target area register 322 is decremented to "0" in step S304. The determination result in step S305 is YES and the processing in steps S307 to S317 is carried out by using the main area of the display device 110 which corresponds to the value "0" as the target area. When the processing in step S317 ends, the processing returns to the status 1 processing since the calling source of cursor movement/scroll processing is step S208.

When the position of the cursor 250 is within tee range of the map display area 210 and "1" input is performed from the input device 108, the cursor movement/scroll processing is recursively called in step S306. When the recursively called cursor movement/scroll processing is started, the value stored in the target area register 322 is incremented to "2" in stop S301. Since there is no area corresponding to the value t+2+t, the determination result in step S302 becomes NO. The value of the target area register 322 is decremented to 'r' in step S304.

Sine the determination result in step S305 becomes NO, the processing is returned to the calling source of cursor movement/scroll processing. Since the calling source is step S306 when the processing is returned to the calling source, the processing goes to step S307. Because there are two calls and one returning so far, it follows that the calling source of the cursor movement/scroll pressing executed at this point results in the processing in step S208 where the first call was carried out. Processing in steps S307 to S317 are carried out by using the map display area 210, which corresponds to the value "1", as the target area, when the processing in step S317 ends, the processing returns to the status 1 processing since the calling sow of cursor movement/scroll processing is step S208.

As explained above, in the car navigation system 1 according to the present embodiment, the main screen 200 includes multiple buttons 201 to 20n and the map display area 210. A user moves the cursor 250 to each of the buttons 201 to 20n to perform the decision input from the input device 108, thereby making it possible to shift the processing to processing that is assigned to the button in which the cursor 260 is positioned. The user moves the cursor 250 to a desired position of the map 211 displayed in the map display area 210 to allow selection of a desired destination. The map 211 can be scrolled in the map display area 210 when the entire map 211 can not be displayed in the map display area 210.

When the user performs the directional input without perform the "1" input from the input device 108, the cursor 250 moves within the range of the main area of the display device 110. The user can easily move the cursor 250 to the buttons 201 to 20n and the map display area 210. When the user performs the directional input while performing the "1" input from the input device 108, the cursor 250 moves within the large of only the map display area 210. When the user performs the directional input to move the cursor 250 to be outside of the map currently displayed in the map display area 210, the map 211 is scrolled in the map display area 210. The user can move the cursor 250 within the range of the map display area 210 while displaying a desired position on the map 211 in the map display area 210 with an easy operation.

There is only a slight difference between the operation for moving the cursor 250 in the min area of the display device 110 and the operation for scrolling the map 211 while moving the cursor 250 in the map display area 210. The difference between two operations is simply whether or not the "1" input is performed with the input device 108. Both operations are common to each other in performing the directional input with the input device 108. The user does not have to significantly change the operation method according to the processing. This improves user operability.

The configuration components necessary for the input device 108 to perform the processing are only the joystick as a pointing device, which is used to perform the directional input when the user inputs a desired direction, the decision input section shared based on the difference in the operability of the joystick, and the numeric key "1" which is used to perform the "1" input. A device with a simple strut may be applied to the input device 108 and this makes it easy for the user to operate the input device 108. The user can easily move the cursor 250 and scroll the map 211.

When the "1" input is performed from the input device 108, the cursor 250 is moved in only the map display area 210. Even when the directional input is performed to move the cursor 250 outside of the map display area 210, the cursor 250 is not moved but the map 211 is scrolled. When the "1" input is not performed with the input device 108, the map 211 is not scrolled but the cursor 250 moves outside of the map display area 210. The map 211 is scrolled only when the "1" input occurs, thereby preventing trouble in which the map 211 is scrolled regardless of a user's intention, making it difficult to obtain necessary information.

In order to sol the map 211 in the map display area 210, the user may perform the directional input in such a way to move the cursor 250 outside of the map display area 210 while performing the "1" input with the input device 108. The main screen 200 does not need the area for showing instructions to scroll the map 211 separately from the map display area 210. The area for displaying originally necessary information to the user is not reduced in the main screen 200.

On the main screen 200 of FIG. 2, the map display area 210 is set inside of the main area of the display device 110 and the map 211 is scrolled in the map display area 210. Processing illustrated in FIGS. 6 and 7 can also be applied to a screen 8 shown in FIG. 8. On the screen 8, a second area 810 is set inside of the main area 800 of the display device 110, and a third area 820 is set inside of the second area 810. Third information is scrolled in the third area 820, and second information including the third area 820 is scrolled in the second area 810.

The numeric key of the input device 108 for moving the cursor 250 within the range of the second area 810 are different from the key of the input device 108 for moving the cursor 250 within the range of the third area 820. The numeric keys, which correspond to the area IDs of the respective areas, can be assigned to the second area 810 and the third area 820. In step S303 of FIG. 7, it is determined whether the number or the key, which is equal to or larger than the value of the target area register 322, is input. In this case, it is possible to provide the numeric key display sections 801, 811, 821 that are assigned to move the cursor 260 within the range of the respective areas 800, 810, and 820 as illustrated by broken lines in FIG. 8.

In the case where the cursor 250 is positioned within the range of the third area 820 and "2" input is performed, the cursor 250 is moved within the range of the third area 820 and the third information is scrolled in the area 820 as needed. In the case where the cursor 250 is positioned within the range of the second area 810 including the third area 820) and "1" input is performed, the cursor 250 is moved within the range of the second area 810 and the second information including the third area 820 is scrolled in the second area 810 as needed.

An explanation will be given of a data structure of the screen 8 of FIG. 8 by comparing with the data structure of the main screen 200 of FIG. 2. Area IDs of the areas 800, 810, and 820 are 0, 1, and 2, respectively.

The upper left position and lower right position of each of the areas 800, 810, and 820 are indicated by coordinates of a coordinate system that is set according to each area (in the case of the main area 800, the same as the coordinates on the above display device 110). Data corresponding to the ma area 800 and the second area 820 includes the same data as the sub area data 307 of the main area data 300 of FIG. 4. The upper left position and lower right position of the sub area data included in the second area 810 are indicated in the coordinates of the coordinate system of the second area 810. Data corresponding to the third area 820 does not include the same data as the sub area data 307.

Figure 8:
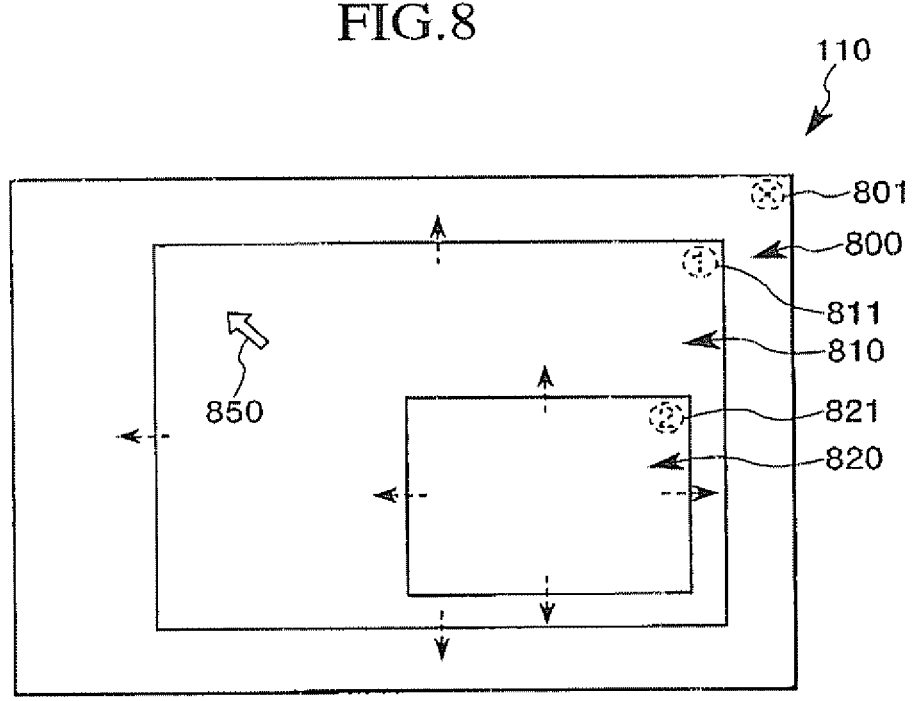
FIG. 8 is a view illustrating a modification of a configuration of the main screen displayed on the display device according to the first embodiment of the present invention.

The following will explain the processing, particularly the cursor movement/scroll movement, when the screen 8 of FIG. 8 is applied. It is assumed that the cursor movement/scroll processing is called when the cursor 250 is positioned within the range of the third area 820 (in this case, the cursor 250 is positioned within the range of the second area 810, too) and "1" input is performed. In the cursor movement/scroll processing first called from the step S208, the value stored in the target area register 322 is incremented to "1". In steps S302 and S303, it is determined that the cursor 250 is within the range of the second area 810, which corresponds to the value "1", and "1" input is performed. In step S306, the cursor movement/scroll processing is recursively called. This call of the cursor movement/scroll processing is the second call.

In the cursor movement/scroll processing called for the second time, the value stored in the target area register 322 is incremented to "2." In steps S302 and S303, it is determined that the cursor 250 is within the range of the third area 820, which corresponds to the value "2" and "1" input is performed. In step 306, the cursor movement/scroll processing is further recursively called. This call of the cursor movement/scroll processing is the third call.

In the cursor movement/scroll processing called for the third time, the value stored in the target area register 322 is incremented to "3". In step S302, it is determined that there is no area corresponding to the value "3", then, the value of the target area register 322 is decremented to "2." The processing is returned to the cursor movement/scroll processing called for the second time from the cursor movement/scroll processing called for the third time. Processing in steps S307 to S317 are cared out by using the area 820, which corresponds to the value "2" as the target area. In stop S317 of the cursor movement/scroll processing called for the second time, the contents of the input information register 330 stored in a predetermined area of the RAM 103 are erased.

When processing in step S317 is ended, the processing is returned to the cursor movement/scroll processing called for the first time from the cursor movement/scroll processing called for the second time. Processing in step S307 to S317 is carried out by using the area 810, which corresponds to the value "1", as the target area. It is noted that the contents of the input information register 330 stored in the work area of the RAM 103 are already erased. In the steps S307 to S317 of the cursor movement/scroll processing called for the first time, the cursor 250 is not moved and information is not scrolled. When processing in step S317 ends, the processing returns to the status 1, processing from the cursor movement/scroll processing called for the second time.

In the screen 8 illustrated in FIG. 8, three areas of first area 800, second area 810, and third area 820 are provided. Although information is scrolled in the third area 820, information including the third area 820 is also scrolled in the second display area 810. It is considered that the relationship between the first area 800 and the second area 810 is the same as that between the second area 810 and the third area 820. The cursor movement/scroll processing for performing the movement of the cursor 250 and the scroll of information can be recursively called. This eliminates the need for preparing a different program based on the relationship between the first area 800 and the second area 810 and the relationship between the second area 810 and the third area 820, so that the storage capacity necessary for storing the program may be small.

The following will explain a second embodiment of the present invention with reference to FIGS. 9 to 12.

The configuration of the car navigation system 1 applied to this embodiment is similar to that explained in the first embodiment. However, in this embodiment, the joystick that configures the input device 108 can input only one of up, down, left, and right directions. The decision input by the joystick is the same as that of the first embodiment. The input device 108 includes a cancel key in addition to the joystick. The numeric keys of the input device 108 are not used in this embodiment.

FIG. 9 is a view illustrating a destination selection screen displayed on the display device 110 according to this embodiment. As illustrated in the figure, a destination selection screen 900 has three buttons 901 to 903 on the upper portion of the screen 900, and a destination display area 905 on the lower portion of the screen 900. The user can select a desired destination from multiple destination candidates 905a to 905f displayed in the destination display area 905. The user can select any one of the buttons 901 to 3 or the destination candidates 905a to 905f listed in the destination display area 905. In the explanation set forth below, "alternatives" mean the respective buttons 901 to 903 and the respective destination candidates 905a to 905f.

In the destination selection screen 900, a cursor (anchor) 921 of a normal mode is added to any of the alternatives. The cursor 921 of the normal mode can be also added to the destination display area 905. The cursor 921 is used when the user selects any of the alternatives (or destination display areas 905). In the first stage, the cursor 921 of the normal mode is moved according to the directional input from the input device 108 among the buttons 901 to 903 and the destination display area 905. When the user performs the decision input with the input device 108 while the cursor 921 of the normal mode points to the destination display area 905, a cursor 922 of a special mode is in the destination display area 905, in place of the cursor 921 of the normal mode. When the user performs the up and down directional inputs with the input device 108 while the cursor 922 of the special mode is added to the destination display area 905, the destination candidates 905a to 905f displayed in the destination display area 905 are scrolled in the direction opposite to the input direction.

When the user performs the decision input with the input device 108 while the cursor 922 of the special mode is in the destination display area 905, the cursor 922 of the special mode is erased and the cursor 921 of the normal mode is added to one of the destination candidates 905a to 905f, which is displayed at the top in the destination display area 905. When the user performs the up and down directional inputs with the input device 108, the cursor 921 is moved among the destination candidates 905a to 905f according to the input direction. When the destination candidates 905a to 905f in the moving direction of the cursor 921 are not currently displayed in the destination display area 9057 the destination candidates 905a to 905f are scrolled according to the input direction.

When the user performs the cancel input from the input device 108 while the cursor 921 of the normal mode points to one of the destination candidates 905a to 905f, the cursor 921 of the normal mode is erased and the cursor 922 of the special mode is added to the destination display area 905. When the user performs the noel input from the input device 108 while the cursor 922 of the special mode is in the destination display area 905, the cursor 921 of the normal mode is added to the destination display area 905, in place of the cursor 922 of the special mode.

The following will explain the relationship between the input from the input device 108 and the change in the display of the destination selection screen 900 based on examples. FIGS. 10A to 10K are views each illustrating the examples in which the display mode of the destination selection, screen 900 is changed according to the input from the input device 108.

Figure 10A:
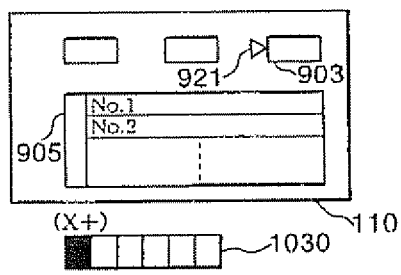
FIGS. 10A to 10K are views each illustrating a state in which a display mode of the destination selection screen is changed in response to an input from an input device according to the second embodiment of the present invention.

It is assumed that the cursor 921 of the normal mode is at the button 903 as illustrated in FIG. 10A. It is also assumed that the destination candidates No. 1, No. 2 . . . are displayed in the destination display area 905 in descending order. It is also assumed that the right directional input (x+ directional input) is performed by the input device 108 in a state as illustrated in FIG. 10A. When the right link in the directional links 100e (discussed later) indicates the destination display area 905, the cursor 921 of the normal mode is moved to the destination display area 905 from the button 903 as illustrated in FIG. 10B.

Figure 10B:
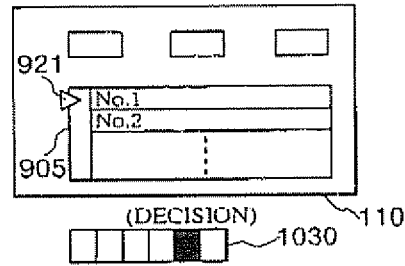
Figure 10C:
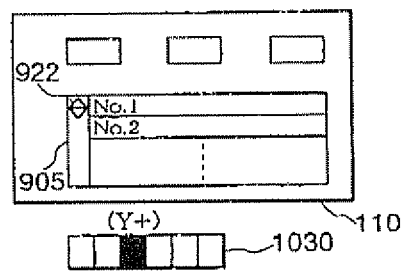
Figure 10D:
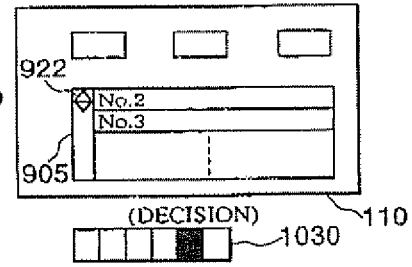

It is next assumed that the decision input is performed with the input device 108 when the cursor 921 of the normal mode is in the destination display area 905 as illustrated in FIG. 10B. As illustrated in FIG. 10C, the cursor 922 of the special mode is in the destination display area 905, in place of the cursor 921 of the normal mode. It is next assumed that the downward input (y+ directional input) is performed with the input device 108. As illustrated in FIG. 10D, the destination candidates No. 1, No. 2, . . . , which are displayed in the destination display area 905, are scrolled upward (in a direction opposite to the input direction).

Figure 10E:
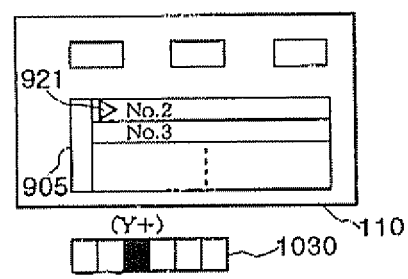

It is next assumed that the decision input is performed with the input device 108 when the cursor 922 of the special mode is shown in the destination display area 905). As illustrated in FIG. 10E, the cursor 921 of the normal mode is added to the destination candidate No. 2 displayed at the top of the destination display area 905.

Figure 10F:
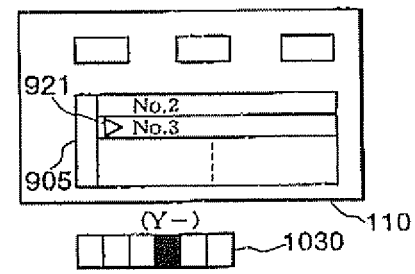
Figure 10G:
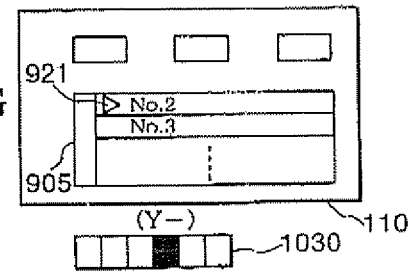

Next, it is assumed that the down directional input (y+ directional input) is performed with the input device 108 in a state as illustrated in FIG. 10E. As illustrated in FIG. 10F, the cursor 921 of the normal mode is moved to the destination candidate No. 3 displayed below the destination candidate No. 2. It is next assumed that the upward directional input (y– directional input) is performed in a state as illustrated in FIG. 10F. As illustrated in FIG. 10G, the cursor 921 of the normal mode is moved to the destination candidate No. 2 displayed above the destination candidate No. 3.

Figure 10H:
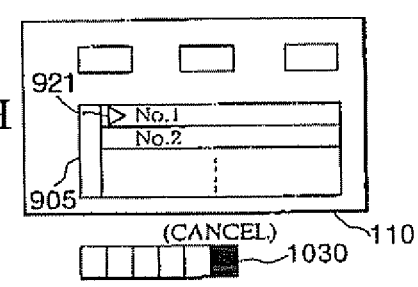

Now it is assumed that the up directional input (y– directional input) is performed with the input device 108 in a state as illustrated in FIG. 10G. The destination candidate No. 1 above the destination candidate No. 2 to which the cursor 921 of the normal mode points is not displayed in the destination display area 905. As illustrated in FIG. 10H, the destination candidates No. 1, No. 2, . . . are scrolled in the destination display area 905 to display the destination candidate No. 1 above the destination candidate No. 2. The cursor 921 of the normal mode is moved to the destination candidate No. 1.

Figure 10I:
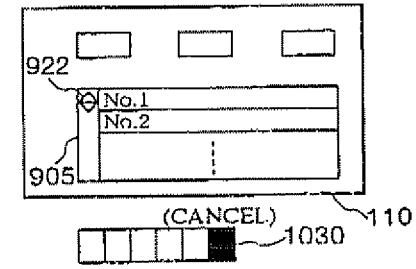
Figure 10J:
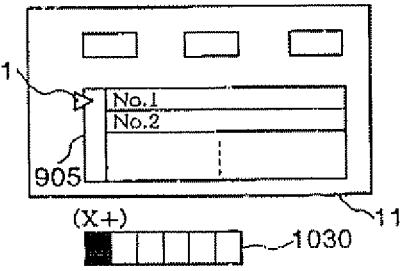

It is assumed that the cancel input is performed with the input device 108 in a state as illustrated in FIG. 10H. As illustrated in FIG. 10I, the cursor 922 of the special mode is in the destination display area 905. Next, it is assumed that the cancel input is performed with the input device 108 in a state as illustrated in FIG. 10I. As illustrated in FIG. 10J, the cursor 921 of the normal mode is added to the destination display area 905, in place of the cursor 922 of the special mode.

Figure 10K:
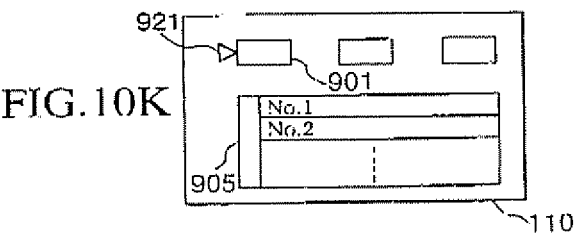

Finally, it is assumed that the right directional input (x+ directional input) is performed with the input device 108 in a state as illustrated in FIG. 10J. When the right link of the directional links 1004e (discussed later) indicates the button 901, the cursor 921 of the normal mode is moved to the button 901 from the destination display area 905, as illustrated in FIG. 10K.

An explanation will be given of various data necessary to display the destination selection screen 90 on the display device. FIG. 11A is a view illustrating data components of the destination selection screen 900 in FIG. 9. As illustrated in the figure, data of the destination selection screen 900 is composed of main area data 1000 and destination display area data 1010. The destination display area data 1010 is data for displaying the destination candidates 905a to 905f in the destination display area 905. The main area data 1000 is data for displaying data, except the destination display data 1010, in the main area of the display device 110.

The main area data 1000 has an area ID 1001, an upper left position 1002, and a lower right position 1003. The destination display area data 1010 also has an area ID 1011, an upper left position 1012, and a lower right position 1013. These items correspond to the area IDs 301, 311, upper left positions 302, 312, and lower right positions 303 and 313 of the main area data 300 and the map display area data 310 of the first embodiment, respectively.

The main area data 1000 ha button-1 data 1004, button-2 data 1005, and button-3 data 1006, which respectively correspond to the buttons 901 to 903 provided in the destination selection screen 900, and sub area data 1007 corresponding to the destination display area 905. The button-1 data 1004 has an ID 1004a assigned to the corresponding buttons 901. The sub area data 1007 has an ID 1007a assigned to the destination display area 905.

The button-1 data 1004 has an upper left position 1004b and a lower right position 1004c of the button 901. The upper left position 1004b is shown by coordinates of the upper left position of the button 901 and the lower right position 1004c is shown by coordinates of the lower right position of the button 901. The sub area data 1007 has an upper left position 1007b and a lower right position 1007e of the destination display area 905. The upper left position 1007b is shown by coordinates of the upper left position of the destination display area 905 and the lower right position 1007c is shown by coordinates of the lower right position of the destination display area 905. The button-1 data 1004 has link data 1004d and the sub area data 1007 has link data 1007d. These data items correspond to link data 304c and 307c of the first embodiment, respectively.

The button-1 data 1004 and the sub area data 1007 have directional links 1004e and 1007e, respectively. The directional links 1004e and 1007c indicate other buttons or areas to which the cursor 921 of normal mode moves according to the directional input of up, down, left and right from the input device 108. In each of the directional links 1004e and 1007e, at least one ion may be set. For example, only a right link may be set in the directional links 1004e of the button-1 data 1004. The cursor 921 does not move, when the up, down or left directional input is received. If the right link of the button-1 data 1004 (button 901) indicates the button 902, the cursor 921 moves from the button 921 to the button 922, when the right directional input is received and the cursor 921 positioned at button 921. Although not illustrated here, the specific configuration of each of the button-2 data 1005 and button-3 data 1006 is the same as that of the button 1 data 1004.

The destination display area data 1010 has an area ID1011, an upper left position 1012, and a lower right position 1013. These items correspond to the area ID311, the upper left position 312, and the lower right position 313, respectively. The destination display area data 1010 has destination-1 data 1014, and destinations-2 data 1015, . . . destination-n data loin corresponding to the destination candidates 905a to 905f, respectively. The destinations data 1014 has an individually assigned ID1014a. The link 1007d of the sub area data 1007 and the area ID1011 of the destination display data 1010 have the same value.

The destination-1 data 1014 has an upper left position 1014b and a lower right position 1014. The upper left position 1014b and the lower right position 1014 are shown by local coordinates. The destination-1 data 1014 has destination data 1014d (including a destination address and local coordinates on the map) and directional links 1014e to indicate the other destination candidates 905a to 905f for moving the cursor 921 of the normal mode according to the directional input of up and down from the input device 108. Although not illustrated here, the specific configuration of each of the destination 2 data 1015 to destination-n data 101n is the same as that of the destination-1 data 1014.

The positions of the cursors 921 and 922 are identified by the IDs 1004a, 1007a, and 1014a, each assigned to the buttons 901 to 903, the destination display area 905, and the respective destination candidates 905a to 905f in the destination display area 905. When the destination candidates 905a to 905f are displayed in the destination display area 905, the upper left position 1014b and the lower right position 1014c in the local coordinates of the destination-1 data 1014, destination-2 data 1015, . . . destination-n data 101n are transformed into coordinates on the screen of the display device 110 according to the upper left position 1007b and the lower right position 1012. When the other destination candidates 905a to 905f indicated by the directional link 1014e of a destination candidate to which the normal mode cursor 921 points are determined, the upper left position 1014b and the lower right position 1014c in the local coordinates of the destination 1 data 1014, destination-2 data 1015, . . . destination-n data 101n are transformed into coordinates on the screen of the display device 1109 in the same manner.

FIG. 11B is a view illustrating various types of registers provided in the RAM 103 to control the display of the destination selection screen 900. The registers to control the display of the destination selection screen 900 include a processing status register 1020, a cursor position register 1021, a cursor status register 1022, and a continuous input counter 1023. The processing status register 1020 is the same as the processing status register 320 of the first embodiment.

The cursor position register 1021 is a register indicating the alternatives or areas to which the cursors 921 and 922 are added. Data recorded in the cursor position register 1021 includes IDs of the buttons 901 to 903, the destination display area 905, and the respective destination candies 905a to 905f. The cursor status register 1022 is a register indicating whether the cursor 921 of the normal mode is displayed or the cursor 922 of the special mode is displayed.

The continuous input counter 1023 is a counter that increments each frame period during which the directional input (regardless of whether the input is the initial input or continuous input) is performed with the input device 108 and is cleared for frame periods during which no directional input is performed. When the value of the continuous input counter 1023 is 1 or 15+5K (K is an integer number of 0 or more) and the cursor 921 of the normal mode is displayed on the destination selection screen 900, the position of the cursor 921 of the normal mode is moved according to the directional input from the input device 108. Though the position of the cursor 921 is first moved when the value of the continuous input counter 1023 is "1," it is not moved again until the continuous input counter 1023 exceeds "14." when the continuous input counter 1023 becomes "15," the position of the cursor 921 can be moved according to the continuous input.

FIG. 11C is a view illustrating a configuration of an input information register provided in the RAM 103. An input information register 1030 is prepared one bit by one bit for each kind of input received from the input device 108. The input information register 1030 includes an x+ directional input bit 1031, an x- directional input bit 1032, a y+ directional input bit 1033, a y- directional input bit 1034, a decision input bit 1035, and a cancel input bit 1036. The bits 1031 to 1036 are set when each corresponding input is performed from the input device 108.

When the contents of the input information register 1030 are read by the CPU 101, all bits 1031 to 1036 of the input information register 1030 are reset. When the directional input or the decision input from the input device 108 is continued, the hits 1031 to 1034 are set similar to the first embodiment, but the decision input bit 1035 is not set. Similar to the decision input bit 1035, the cancel input bit 1036 is set only when the cancel input is first performed with the input device 108, and the cancel input bit 1035 is not set again even when the cancel input is continuously performed.

The following will explain processing in the car navigation system 1 according to this embodiment. The main processing performed for each frame period is the same as that explained in the first embodiment. The processing of the display control of the destination selection screen 900 is carried out when the processing status stored in the processing status register 1020 is "2".

Figure 12:
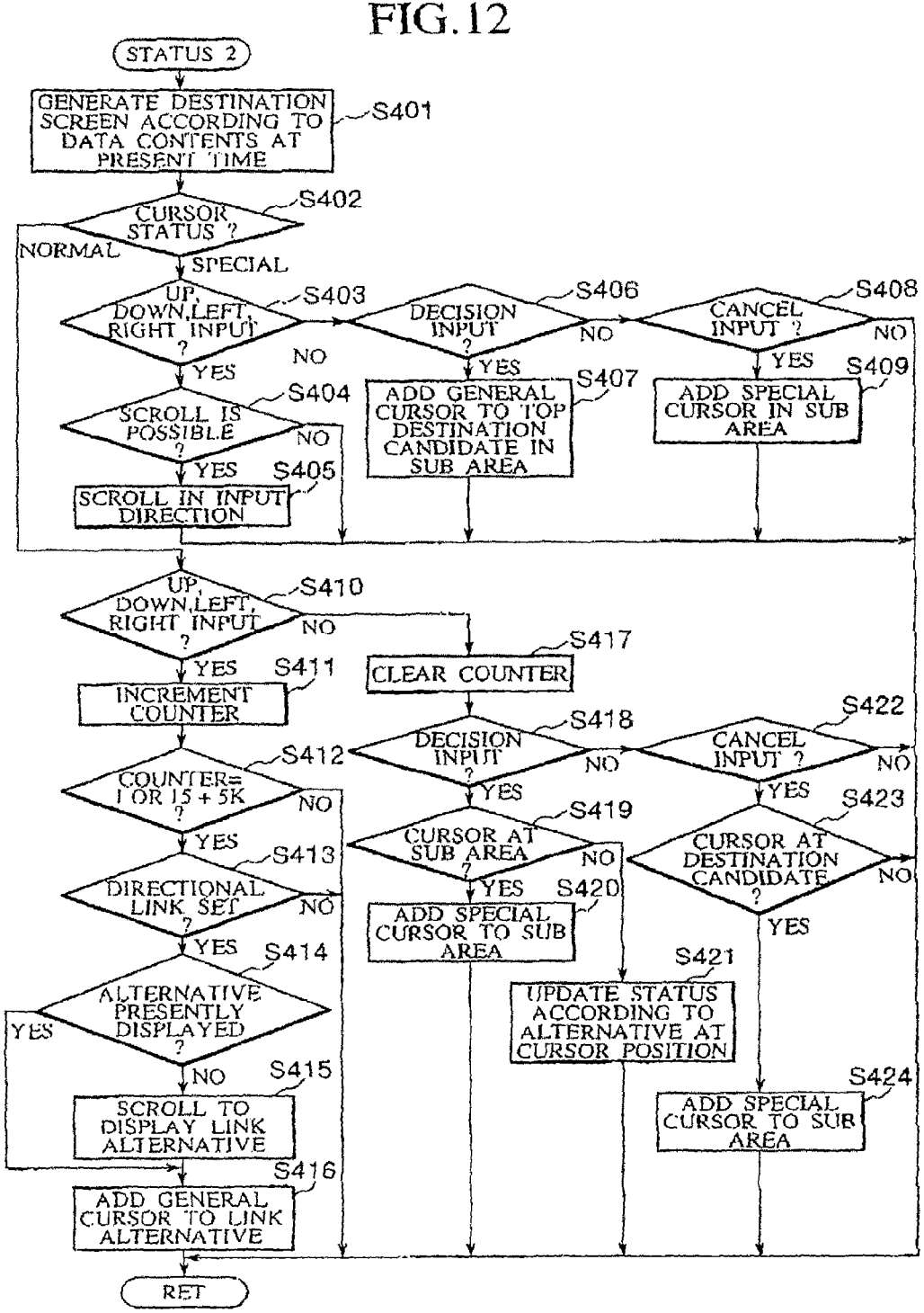
FIG. 12 is a flowchart specifically illustrating status 2 processing according to the second embodiment of the present invention.

The following will specifically explain the status 2 processing in step S104 according to this embodiment. FIG. 12 is a flowchart specifically illustrating the status 2 processing.

In the status 2 processing, the CPU 101 outputs image data developed in the frame memory of the RAM 103 for the previous frame period to the display device 10 via the display interface 109 and causes the display device 110 to display the image. Except the case in which the processing status was changed to "2" for the previous frame period, the image displayed on the display device 110 results in the destination selection screen 900.

The CPU 101 generates image data of the destination selection screen 900 based on the main area data 1000 and the destination on display area data 1010 at the present time and develops the generated image data in the frame memory (one different from the other used for the previous period) of the RAM 103. The CPU overlays image data of the cursors 921 or 922 according to the ID stored in the cursor position register 1021 and the status stored in the cursor status register 1022 in the frame memory (step S401).

The CPU 101 determines whether the cursor 921 of the normal mode is displayed on the destination selection screen 900 or the cursor 922 of the special mode is displayed thereon by referring to the cursor status register 1022 (step S402). When the cursor 922 of the special mode is displayed, the CPU 101 determines whether the up, down, left or right directional input is performed for the previous frame period by checking whether the x+ directional input bit 1031, the x- directional input bit 1032, the y+ directional input bit 1033, or the y- directional input bit 1034 of the input information register 1030, which were read in step S101, is set (S403).

When the up, down, left or right directional input was performed, the CPU 101 determines whether the destination candidates 905*a* to 95*f* mean be scrolled in the destination display area 905 according to the input direction (step S403). When the left or right directional input is performed, the destination candidates 905*a* to 905*f* cannot be scrolled. When the upward input is performed and any of the destination candidates 905*a* to 905*f* of the uppermost portion is displayed at the top of the area 905, the destination candidates 905*a* to 905*f* cannot be scrolled. When the downward input is performed and any of the destination candidates 905*a* to 905*f* of the lowermost portion is displayed at the bottom of the area 905, the destination candidates 905*a* to 905*f* cannot be scrolled.

When the destination candidates 905*a* to 905*f* ran be scrolled, the CPU 101 updates the upper left position 1012 and the lower right position 1013 of the destination display area 1010 according to the input direction and scrolls the destination candidates 905*a* to 905*f* in the direction opposite to the input direction in the destination display area 905. The status 2 processing ends and the processing returns to the main processing of FIG. 5. When the destination candidates 905*a* to 905*f* cannot be scrolled, the status 2 processing ends and the processing returns to the main processing of FIG. 5.

When a directional input is not performed in step S403, the CPU 101 determines whether the decision input is performed by the input device 108 for the previous frame period by determining whether the decision input bit 1035 of the input information register 1030, which was read in step S101, is set (S406). When the decision input is performed, the CPU 101 updates the status stored in the cursor status register 1022 to the cursor 921 of the normal mode. The CPU 101 stores the ID, which corresponds to one of the destination candidates 905*a* to 905*f* displayed at the highest position at the present time in the destination display area 905, in the cursor position register 1021 (step S407). The status 2 processing ends and the processing re to the main processing of FIG. 5.

When the decision input is not performed, the CPU 101 determines whether the cancel input is performed with the input device 108 for the previous frame period by determining whether the cancel input bit 1036 of the input information register 1030, which was read in step S101, is set (S408). When the cancel input was performed, the CPU 101 updates the status stored in the cursor status register 1022 to the cursor 921 of the normal mode. The CPU 101 stores the ID of the destination display area 905 in the cursor position register 1021 (step S409). The status 2 processing ends and the processing returns to the main processing of FIG. 5.

When the cursor 921 of the normal mode is displayed in step S402, the CPU 101 determines whether the up, down, left or right directional input is performed for the previous frame period by determining whether the x+ directional input bit 1031, the x- directional input bit 1032, the y+ directional input bit 1033, or the y- directional input bit 1034 of the input information register 1030, which were read in step S101, is set (S410).

When the up, down, left or right directional input is performed, the CPU 101 increments the value of the continuous input counter 1023 by one (step S411). The CPU 101 determines whether the value of the continuous input counter 1023 is 1 or 15+5K (step S412). When the value of the continuous input counter 1023 is neither 1 nor 15+5K the status 2 processing ends and the processing returns to the main processing of FIG. 5.

When the value of the continuous input counter 1023 is 1 or 154+K, the CPU 101 determines whether the directional link, corresponding to the direction input from the input device 108, is set in the directional links 1004*e*, 1007*e* or 1014*e* of the buttons 901 to 903, the destination display area 905, or the respective destination candidates 905*a* to 905*f*, which correspond to the ID stored in the cursor position register 1021 (step S413). When the directional link corresponding to the input direction, is not set, the status 2 processing ends and the processing returns to the main processing of FIG. 5.

When the directional link, corresponding to the input direction, is set, the CPU 101 determines whether the buttons 901 to 903, the destination display area 905, or the respective destination candidates 905*a* to 905*f*, which is indicated by the link, is displayed on the display device 100 at the present time (step S414). When the ID stored in the cursor position register 1021 is one of the IDs corresponding to the buttons 901 to 903 or the destination display area 905, it is determined that the buttons 901 to 903 or the destination display area 905, indicated by the link, is displayed. When the buttons 901 to 903, the destination display area 905, or the respective destination candidates 905*a* to 905*f*, indicated by the link, is displayed, the processing goes to step S416.

When the destination candidates 905*a* to 905*f*, indicated by the link are not displayed, the CPU 101 scrolls the destination candidates 905*a* to 905*f* in the destination display area 905 according to the input direction from the input device 108 in such a way that the destination candidates 905*a* to 9054 indicated by the link, are to be displayed (step S415). The processing goes to stop S416. In step S416, the CPU 101 stores the ID of the buttons 901 to 903, the destination display area 905, or the destination candidates 905*a* to 905*f*, indicated by the link, in the cursor position register 1021. The status 2 processing ends and the processing returns to the main processing of FIG. 5.

When a directional input is not performed in step S410, the CPU 101 resets the value of the continuous input counter 1023 to 0 (step S417). The CPU 101 determines whether the decision input is performed with the input device 108 for the previous frame period by determining whether the decision input bit 1035 of the input information register 1030, which was read in step 101, is set (step S418).

When the decision input is performed, the CPU 101 determines whether the cursor 921 of the normal mode is in the destination display area 905 by determining whether the ID stored in the cursor position register 1021 is an ID corresponding to the destination display area 905 (step S19). When the cursor 921 of the normal mode is in the destination display area 905, the CPU 101 updates the status stored in the cursor status register 1022 to the cursor 922 of the special mode (step 420).

When the cursor 921 of the normal inode is not in the destination display area 905, the CPU 101 performs processing corresponding to the buttons 901 to 903 or the destination candidates 905*a* to 905*f* corresponding to the ID stored in the cursor position register 1021. For example, when the cursor 921 of the normal mode pots to one of the buttons 901 to 903, the CPU 101 stores the processing status, which is set in the link 1004*d* of the relevant button, in the processing status register 1020. When the cursor 921 of the normal mode points to any of the destination candidates 905*a* to 905*f*, the CPU 101 temporarily stores the destination 1014*d* of the destination candidate, to which the cur 921 points, in a predetermined area of the RAM 103 and stores processing status, which is used to search a route from the current position to the destination on the map, in the processing status register 1020 step S421). The status 2 processing ends and the process returns to the main processing of FIG. 5.

When the decision input is not performed in step S418, the CPU 101 determines whether the cancel input is performed with the input device 108 for the previous period by determining whether the cancel input bit 1036 of the input information register 1030, which was read in step S101, is set (step S422). When the cancel input was not performed, the status 2 processing ends and the processing returns to the main processing of FIG. 5.

When the cancel input was performed, the CPU 101 determines whether the cursor 921 of the normal mode points to one of the destination candidates 905*a* to 905*f* by determining whether the ID corresponding to one of the destination candidates 905*a* to 905*f* is stored in the cursor position register 1021 (step S423). When the cursor 921 of the normal mode is not in one of the destination candidates 905*a* to 905*f* the status 2 processing end and the processing returns to the main process of FIG. 5.

When the cursor 921 of the normal mode is at one of the destination candidates 905*a* to 905*f*, the CPU 101 stores the ID of the destination display area 905 in the cursor position register 1021. The CPU 101 updates the status stored in the cursor status register 1022 to the cursor 922 of the special mode (step S424). The status 2 processing ends and the processing returns to the main processing of FIG. 5.

As explained above, in the cat navigation system 1 according to this embodiment the destination selection screen 900 includes three buttons 901 to 903 and the destination display area 96. There are provided up, down, left, and right links between each of the buttons 901 to 903 and the destination display area 905, and when the directional input is performed from the input device 108, the cursor 921 of the normal mode is moved among the buttons 901 to 903 and the destination display area 905. When the decision input is received from the input device 108 at the time when the cursor 921 of the normal mode is placed at any of the buttons 901 to 903, the processing that is assigned to the button 901 to 903 at which the cursor 921 is positioned is carried out.

When the decision input is performed and the cursor 921 of the normal mode is shown in the destination display area 905, the cursor 922 of the special mode is added to the destination display area 905, in place of the cursor 921 of the normal mode. When the directional input is performed with the input device 108 in this state, the destination candidates 905*a* to 905*f* are scrolled in the destination display area 95. When the decision input is performed with the input device 108 and the cursor 922 of the special mode is in the destination display area 905, the cursor 921 of the normal mode is added to one of the destination candidates 905*a* to 905*f* displayed in the destination display area 905. When the directional input is performed from the input device 108 and the cursor 921 of the normal mode points to one of the destination candidates 905*a* to 905*f*, the cursor 921 of the normal mode is moved to another destination candidates 905*a* to 905*f* according to the input direction. When the destination candidates 905*a* to 905*f* which the cursor 921 is to move, is not displayed in the destination display area 9057 the relevant destination candidates 905*a* to 905*f* is displayed by scrolling.

When the cancel input is performed with the input device 108 and the cursor 921 of the normal mode is at one of the destination candidates 905*a* to 905*f* in the destination display area 905, the cursor 922 of the special mode is added to the destination display area 905 again. When the cancel input is performed with the input device 108 and the cursor 922 of the special mode is shown in the destination display area 905, the cursor 921 of the normal mode is added to the destination display area 906 again.

In a first state, when the directional input is performed with the input device 108, the cursor 921 of the normal mode is moved among three buttons 901 to 903 and the destination display area 905 provided in the destination selection screen 900. In a second state, the cursor 922 of the normal mode is in the destination display area 905 and the destination candidates 905*a* to 905*f* are scrolled in the destination display area 905. In a third state, the cursor 921 of the normal mode is moved among the destination candidates 905*a* to 905*f* while the destination candidates 905*a* to 905*f* are scrolled in the destination display area 905, as required.

Switching among the first, second, and third states is implemented with a simple operation in which the decision input or the cancel input is performed with the input device 108 when the cursor 921 or 922 is in the destination display area 905. The state at this time is maintained and the processing with the same operability is continued until a new decision input or cancel input is performed. This improves ease of use. The user's operation is common to any of the first, second, and third states in terms of the point in which the directional input is performed from the input device 108. Such a common operation characteristic improves the operability on the destination selection screen 900.

The configuration components necessary for the input device 108 to perform the processing are only the joystick as a pointing device, which is used to perform the directional input when the user instructs a desired direction and the decision input, and the cancel key that is used when the user performs the cancel input. A device with a simple structure may be applied to the input device 108 and this makes it easy for the user to operate the input device 108. The user can easily move the cursors 921 or 922 and scroll the destination candidates 905a to 905f.

On the destination selection screen 90, the cursor 921 of the normal mode can only point to each of the buttons 901 to 903, the destination display area 905, and each of destination candidates 905a to 905f in the destination display area 905. Except the case in which the cursor 921 of the normal mode points to one of the destination candidates 905a to 905f in the destination display area 905, the cursor 921 of the normal mode is moved only among the buttons 901 to 903 and the destination display area 905 according to the directional input of the input device 108. The cursor 921 of the normal mode is moved among the individual candidates 905a to 905f when it points to one of the destination candidates 905a to 905f in the destination display area 905. The cursor 921 of the normal mode cannot be moved among the buttons 901 to 903 and among the respective destination candidates 905a to 905f without displaying the cursor 922 of the special mode. For example, when the user intends to select one of the destination candidates 905a to 905f, the cursor 921 of the normal mode is not directly moved to any of the buttons 901 to 903. This makes it possible for the user to improve the operability.

When the decision input is performed and the cursor 921 of the normal mode is in the destination display area 905, or the cancel input is performed in a state that the cursor 921 of the normal mode points to one of the destination candidates 905a to 9054 the cursor 922 of the special mode is added to the destination display area 905.

When the cursor 922 of the special mode is shown in the destination display area 905, the user can scroll the destination candidates 905a to 905f in the destination display area 905 by performing the upward and downward directional inputs from the input device 108. This makes it possible for the user to easily search a desired candidate from the multiple listed destination candidates 905a to 905. At this time, the cursor 921 or 922 does not point to any of the destination candidates 905a to 905f in the destination display area 905. The cursor 922 of the special mode in the destination display area 905 is different from the cursor 921 of the normal mode. The user can easily determine whether the destination candidates 905a to 905f ran be scrolled by the upward and downward directional inputs based on the difference in cursor modes in the destination display area 905.

When the cursor 921 of the normal mode points to one of the destination candidates 905a to 905f in the destination display area 905, the user can move the cursor 921 of the normal mode among the destination candidates 905a to 905f by performing the directional input from the input device 108. The user can easily select any of the destination candidates 905a to 905f by moving the cursor 921 of the normal mode.

When any of the destination candidates 905a to 905f, to which the cursor 921 is to move, is not displayed in the destination display area 905, the destination candidates 905a to 905f are scrolled in the destination display area 905 in such a way that the destination candidate, to which the cursor is to move, is displayed. By this scrolling, information necessary for the user is always displayed in the destination display area 905.

The present invention is not limited to the above first and second embodiments and various modifications and applications can be applied. The following will explain modifications of the aforementioned embodiments to which the present invention can be applied.

In the first and second embodiments, only information displayed in the map display area 210 or the destination display area 905 is scrolled. Information displayed outside of the map display area 210 or the destination display area 905 may be scrolled in the area where the relevant information is displayed. For example, in the first embodiment, in the se where the cursor 250 is displayed at the end portion of the display device 110, when the cursor 250 is to move outside of the main area of the display device 110, information displayed in the main area of the display device 110 may be scrolled.

In the first embodiment, the map 211 is scrolled in the respective directions of up, down, left, and right in the map display area 210. In the said embodiment, the destination candidates 905a to 905f were scrolled in only the upward and downward directions in the destination display area 905. In contrast to the above, in the first embodiment, information may be scrolled in only the upward and downward directions or left and right directions in the scroll area. In the second embodiment, information may be scrolled in all directions of up, down, left, and right in the scroll area.

In the first and second embodiments, the input device 108 includes the joystick to input the respective directions of up, down, left, and right according to the direction where the joystick is moved.

However, the directional input device included in the input device 108 for performing the directional input may be a directional button, a mouse, or a trackball. When the directional button is used as the directional input device, a device that can perform at least four direction inputs is needed in the first embodiment. In the second embodiment an input device that can perform at least two directional inputs is needed.

When the mouse or trackball is used as the input device that performs the directional input in the first embodiment, the input information register 330 may store a count value indicating degree of movement in the respective directions of up, down, let, and right, for one fame period. An amount of movement of the cursor 250 and an amount of scroll of the map 211 in the map display area 210 can be controlled according to the count value. The decision input and "1" input in the first embodiment, and the decision input and cancel input in the second embodiment can be assigned to predetermined keys or buttons according to the configuration of the input device 108.

In the first embodiment, when the cursor 260 is positioned in the map display area 210 and the "1" input is performed with the input device 108, the map 211 is scrolled when the cursor 250 is to move outside the map display area 210 according to the input from the input device 108. In contrast to the above, when the cursor 250 is positioned in the map display area 210 and the "1" input is performed with the input device 108, the cursor 250 may be changed to a grip cursor whose mode is different from that of the cursor 250. When the direction input is performed with the input device 108 and the grip cursor whose mode is different from that of the cursor 250 is displayed, the map 211 can be scrolled in the map display area 210.

In the second embodiment, when the decision input is performed and the cursor 921 of the normal mode is in the destination display area 905, the cursor 922 of the special mode is added to the destination display area 905, in place of the cursor 921 of the normal mode. At this time, the destination candidates 905a to 905f displayed in the destination display area 905 are scrolled according to the direction input from the input device 108. When the decision input is performed and the cursor 922 of the special mode is in the destination display area 905, the cursor 921 of the normal mode is added to one of the destination candidates 905a to 905f in the destination display area 905. When the cursor 921 of the normal mode points to one of the destination candidates 905a to 905f, the cursor 921 of the normal mode is moved among the destination candidates 905a to 905f according to the directional input from the input device 108, and the destination candidates 905a to 905f in the destination display area 905 are scrolled as required. However, when the decision input is performed and the cursor 921 of the normal mode points to the destination display area 905, the cursor 921 of the normal mode may be added to any of the destination candidates 905a to 905f in the destination display area 905 without using the cursor 922 of the special mode.

In the first embodiment, the main area and the map display area 210 are provided in the entire screen on the display device 110. In the example of FIG. 8, the display area on the display device 110 has three areas including the first area 800, the second area 810, and the third area 820. The display control method as in the first embodiment can be applied to a screen having four or more areas. Similarly the display control method of the second embodiment can be applied to a seen having three or more areas. In the second embodiment, the recursive processing may be used as the processing for controlling the display of the screen. In the first embodiment, the recursive processing may be omittd.

The first and second embodiments are explained with a car navigation system 1 as an example in which the cursors 250 or 921 are moved in the main screen 200 or the destination display area 905 and information is scrolled in the scroll area (map display area 210 or the destination display area 905). However, the present invention is not limited to only the screen of the car navigation system 1. The present invention can be applied to a screen displayed on a game apparatus, a general-purpose personal computer, a digital appliance, a cellular phone, etc. Information to be scrolled in the scroll area may include arbitrary information according to the hardware device and the kind of processing.

In the first and second embodiments, the program and data of the car navigation system 1 is stored in the DVD 106 and distributed. The program and data stored in the DVD 106 is transferred to the RAM 103 or the HDD 104. The storage medium that stores the program and data may include an arbitrary storage medium according to the hardware device to which the present invention is applied, in addition to the DVD 106. For example, when a portable game apparatus, which has a configuration having the display device in the same housing, is used as the hardware device that implements the present invention, a semiconductor memory card may be used as the storage medium that stores the programs and data. The program and data may be prestored in the HDD 104 or the ROM 102.

When an information processing apparatus, which has Internet functions, is used as the hardware device that implements the present invention, the program and data may be stored in a fixed disk device provided in the server apparatus existing on the Internet. The program and data stored in the fixed disk device are distributed to the information processing apparatus via the Internet. For example, when the cellular phone is used as the hardware device that implements the present invention, the program and data can be distributed by this method.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A scroll display control apparatus that controls a display of information, the scroll display control apparatus comprising:
  a display that includes a display area, the display area including a plurality of cursor movement areas, the plurality of cursor movement areas including a scroll area;
  an input interface that receives a plurality of instructions via an input device, each of the plurality of instructions being received via a single user input from the input device, the plurality of instructions including a movement instruction, a scroll instruction, a scroll cancel instruction, an inner area instruction, and an inner area cancel instruction; and
  a processor that executes the plurality of instructions, each of the plurality of instructions being executed in response to the single user input from the input device, wherein the processor:
    sequentially moves a cursor on the display to indicate one of the plurality of cursor movement areas according to the movement instruction input from the input device;
    determines whether the scroll instruction, for scrolling information in the scroll area, is input from the input device when the cursor has been moved to indicate the scroll area;
    determines whether the scroll cancel instruction, that cancels the scroll instruction, is input from the input device;
    scrolls the information in the scroll area according to the movement instruction input from the input device, from when it is determined that the scroll instruction is input, until when it is determined that the scroll cancel instruction is input;
    determines whether the inner area instruction, that moves the cursor to within the scroll area, is input from the input device;
    determines whether the inner area cancel instruction, that cancels the inner area instruction, is input from the input device; and
    moves the cursor to within the scroll area and moves the cursor to indicate a unit of information from among the information in the scroll area according to the movement instruction input from the input device, from when it is determined that the inner area instruction is input, until when it is determined that the inner area cancel instruction is input;

wherein the processor sequentially moves the cursor to indicate one of the plurality of cursor movement areas, according to the movement instruction input from the input device, when the scroll instruction and the inner area instruction have not been received, wherein the processor scrolls the information in the scroll area when the cursor is indicating the scroll area according to the movement instruction input from the input device, when the scroll instruction has been received and the inner area instruction has not been received, and wherein the processor displays information that is not currently displayed in the scroll area to which the cursor moves in the scroll area when the inner area instruction is received and the movement instruction moves the cursor to the information, when the inner area movement instruction has moved the cursor to the scroll area.

2. The scroll display control apparatus according to claim 1, wherein the display indicates that the information in the scroll area is scrollable when the scroll instruction is received.

3. The scroll display control apparatus according to claim 2, wherein the processor moves the cursor to the scroll area to indicate information that is in a given position, from among the information currently displayed in the scroll area, when the inner area instruction is input from the input device.

4. The scroll display control apparatus according to claim 2,
wherein the input device comprises a plurality of direction keys for inputting directional information indicating a direction in the display area, as the movement instruction, and
wherein the cursor is moved in the display area according to the directional information input from the plurality of direction keys.

5. The scroll display control apparatus according to claim 1, wherein the processor moves the cursor to the scroll area to indicate information that is in a given position, from among the information currently displayed in the scroll area, when the inner area instruction is input from the input device.

6. The scroll display control apparatus according to claim 5,
wherein the input device comprises a plurality of direction keys for inputting directional information indicating a direction in the display area, as the movement instruction, and
wherein the cursor is moved in the display area according to the directional information input from the plurality of direction keys.

7. The scroll display control apparatus according to claim 1,
wherein the input device comprises a plurality of direction keys for inputting directional information indicating a direction in the display area, as the movement instruction, and
wherein the cursor is moved in the display area according to the directional information input from the plurality of direction keys.

8. A non-transitory computer-readable storage medium containing an executable computer program for displaying information on a display that, when executed by a processor, causes the processor to perform operations comprising:
sequentially moving a cursor on the display to indicate one of a plurality of cursor movement areas according to a movement instruction input from an input device, the plurality of cursor movement areas including a scroll area;
determining whether a scroll instruction, for scrolling information in the scroll area, is input from the input device when the cursor has been moved to indicate the scroll area;
determining whether a scroll cancel instruction, that cancels the scroll instruction, is input from the input device after the scroll instruction is input from the input device;
scrolling the information in the scroll area according to the movement instruction input from the input device, from when it is determined that the scroll instruction is input, until when it is determined that the scroll cancel instruction is input;
determining whether an inner area instruction, for moving the cursor to within the scroll area, is input from the input device;
determining whether an inner area cancel instruction, that cancels the inner area instruction, is input from the input device after the inner area instruction is input from the input device; and
moving the cursor to within the scroll area and moving the cursor to indicate a unit of information from among the information in the scroll area according to the movement instruction input from the input device, from when it is determined that the inner area instruction is input, until when it is determined that the inner area cancel instruction is input;
wherein the cursor is sequentially moved to indicate one of the plurality of cursor movement areas, according to the movement instruction input from the input device, when the scroll instruction to and the inner area instruction have not been received,
wherein the information in the scroll area is scrolled when the cursor indicates the scroll area according to the movement instruction input from the input device, when the scroll instruction has been received and the inner area movement instruction has not been received,
wherein information that is not currently displayed in the scroll area to which the cursor moves is displayed in the scroll area when the inner area instruction is received and the movement instruction moves the cursor to the information, when the inner area movement instruction has moved the cursor to the scroll area, and
wherein the movement instruction, the scroll instruction, the scroll cancel instruction, the inner area instruction, and the inner area cancel instruction are each received via a single user input from the input device.

* * * * *